United States Patent [19]
Nogami et al.

[11] Patent Number: 5,692,092
[45] Date of Patent: Nov. 25, 1997

[54] RECORDING AND PLAYBACK SYSTEM FOR VARIABLE SPEED PLAYBACK WHEREIN MORE A.C. COEFFICIENTS ARE ALLOTTED TO THE MACROBLOCKS IN THE CENTRAL PART OF AN IMAGE FRAME

[75] Inventors: Hiroaki Nogami, Matsudo; Hironobu Katayama, Noda; Koichi Kawaguchi, Chiba; Kenichi Shiraishi, Noda; Kazuya Aoki, Chiba; Saori Akimoto, Narashino, all of Japan

[73] Assignee: Sharp Kabushiki Kaisha, Osaka, Japan

[21] Appl. No.: 557,498

[22] Filed: Nov. 14, 1995

[30] Foreign Application Priority Data

Nov. 14, 1994 [JP] Japan .................. 6-279389

[51] Int. Cl.⁶ .................. H04N 9/79; H04N 11/02; H04N 5/91; H04N 5/917
[52] U.S. Cl. .................. 386/6; 386/33; 386/68; 386/111
[58] Field of Search .................. 358/310, 335, 358/312, 342; 360/10.1, 9.1, 10.3, 8; 386/6, 33, 68, 111, 81; 364/514; 348/408, 411

[56] References Cited

U.S. PATENT DOCUMENTS

| | | | |
|---|---|---|---|
| 5,103,306 | 4/1992 | Weiman et al. | |
| 5,377,051 | 12/1994 | Lane et al. | 360/33.1 |
| 5,392,223 | 2/1995 | Caci | 364/514 |
| 5,402,146 | 3/1995 | Rodriguez et al. | |
| 5,414,469 | 5/1995 | Gonzales et al. | 348/408 |
| 5,440,345 | 8/1995 | Shimoda | 348/411 |
| 5,450,209 | 9/1995 | Niimura et al. | 358/335 |
| 5,537,215 | 7/1996 | Niimura et al. | 358/335 |
| 5,583,650 | 12/1996 | Lane et al. | 386/81 |

FOREIGN PATENT DOCUMENTS

| | | |
|---|---|---|
| 0 424 060 A2 | 4/1991 | European Pat. Off. |
| 0 606 857 A2 | 7/1994 | European Pat. Off. |
| 3-143086 | 6/1991 | Japan . |
| 2 264 020 | 8/1993 | United Kingdom . |

OTHER PUBLICATIONS

"Data Selection Strategies for Digital VCR Long Play Mode" by J. M. Boyce, IEEE Transactions on Consumer Electronics 40 (1994) Aug., No. 3, pp.269–273.

*A Study On Digital VCR System for ATV in the U.S.A.*, Technical Report of the Institute of Television Engineers of Japan, VR 93–55, vol. 17, No. 59, pp. 7–13.

*Primary Examiner*—Tommy P. Chin
*Assistant Examiner*—David R. Vincent

[57] ABSTRACT

A digital VTR which is able to record a band-compressed signal having a bit-rate of 17 to 60 Mbps of a program while creating a low-bit-rate signal (1.5 to 5 Mbps) having the same program content as well as utilizing the low-bit-rate signal as a signal for the special playback. Variable speed playback data for a certain speed, which is recorded in the limited recording areas for variable-speed playback mode, is adapted to be used for playback at another speed in the variable-speed playback mode. The data structure of variable-speed playback data is adapted to change depending on the image areas on the image frame. Either of these embodiments or the combination of them, improves the quality of a reproduced picture during variable-speed playback mode in which a less amount of data is available than that of data read out at the time of a normal playback mode.

32 Claims, 17 Drawing Sheets i : SYNC BLOCK NUMBER

HEAD ARRANGEMENT OF 180°-OPPOSED POSITION
WHEN A SINGLE-CHIP HEAD IS USED

HEAD ARRANGEMENT WHEN A DOUBLE-CHIP HEAD
IS USED

HEAD ARRANGEMENT WHEN A PAIR OF
DOUBLE-CHIP HEADS ARE USED 5,692,092

RECORDING AND PLAYBACK SYSTEM FOR VARIABLE SPEED PLAYBACK WHEREIN MORE A.C. COEFFICIENTS ARE ALLOTTED TO THE MACROBLOCKS IN THE CENTRAL PART OF AN IMAGE FRAME

BACKGROUND OF THE INVENTION (1) Field of the Invention

The present invention relates to a digital recording and reproducing apparatus in which a digital video signal, a digital sound signal and digital data are all compressed through a high-efficiency coding scheme, and in particular relates to a digital recording and reproducing apparatus in which the recording method of data for variable-speed playback is devised so that limited areas for the data for variable-speed playback can be used effectively in the known digital recording reproducing apparatus.

(2) Description of the Background Art

In order to make an international agreement of standard specifications of a digital VCR (Video Cassette Recorder) for home-use that is expected as the one for a next generation, the HD-DIGITAL VCR CONFERENCE has been set up and an agreement was reached internationally as to between the recording schemes of current television system (Standard Television: to be abbreviated, hereinafter, as SDTV) and that of the Hi-definition Television (to be referred to, hereinafter as HDTV) system in April, 1994. The specifications thus agreed are characterized that both the television signals for the SDTV and the HDTV can be recorded using a common configuration. This method mainly effects high-efficiency coding inside frame. Specifically, the technique mainly performs the discrete cosine transform (to be referred to, hereinafter, as DCT) and the variable-length coding. One of reasons the inside-frame high-efficiency coding technique was adopted is that there is a need for high-speed searching reproduction which makes it easy to effect editing operations. That is, the system should reproduce high-quality pictures without unnaturality when pictures are reproduced in a search mode of at least ten times or less speed.

FIG. 1 is a block diagram briefly showing the above-stated home-use digital VCR which has been internationally consented (those of SD.VCR specifications will hereinafter be referred to as a SD-VCR). An inputted image signal is A/D converted into the luminance signal Y and two kinds of chrominance signals $C_N$ and $C_W$ and then divided into blocks of 8×8 pixels. Thereafter, the data is shuffled for every block in a block shuffling section 101. This is done both to disperse frequency components so as to improve the efficiency of the following high-efficiency coding mainly consisting of the DCT and to disperse burst errors to be caused by dropout at the playback mode. A high-efficiency coding section 102 effects an orthogonal transform using the DCT technique so that the signals are represented by coefficients with respect to frequency components. The section 102 further effects the quantization of the coefficients adaptively as well as the variable-length coding to remove the redundancy or consecutive 0's. Sufficient removal of redundancy in the high-efficiency coding section 102 markedly reduces the bit rate of the signal. In an error correction coding section 103, the thus high-efficiency coded, compressed signal is added with a necessary parity code for correcting code errors which would be generated at the playback mode. In a Sync and ID adding section 104, a synchronizing code for effecting PCM synchronization and an ID code for discriminating the block content are added to each of sync blocks containing the synchronizing code. A modulating section 105 represents a modulator for efficiently recording the recording signal. The 24-25 modulating method is adopted in the modulator used in the configuration of the DVCR specifications for the purpose of reducing the d.c. component. The output from the modulation is amplified through a recording amplifier and recorded on a magnetic recording medium via a video head. At the playback mode, the recorded signal is picked up via the video head, and the thus regenerated signal is amplified through a regenerating amplifier and supplied to a demodulating section 107, to thereby recover digital information. Then, the operation is effected in just the reverse direction or in the opposed direction to that effected in the recording mode. That is, a sync and ID detecting section 108 detects the synchronizing code for PCM as well as decodes and deciphers the content of the ID code. An error correcting and decoding section 109 detects code errors and completely corrects the errors if any. A decoding and modifying section 110 subjects the compressed video information by the high-efficiency coding section to the variable-length decoding and the inverse quantization and effects IDCT for the thus processed video information to recover a video signal approximately corresponding to the original video signal. If there is an erroneous code which is unrecoverable, the section 110 effects interpolation using data before and after the code in question. The thus recovered output is still not the complete video signal, but should be deshuffled by every block in the following deshuffling section 111, to thereby reproduce the original video signal.

FIG. 2 shows a structure and a recording format of sync blocks in the DVCR stated above. Each sync block is composed of 90 bytes containing two bytes for a synchronizing code, three bytes for an ID code and 77 bytes for video data with eight bytes of inner parity of the Reed-Solomon correcting code. Assigned for video data in the format are 135 sync blocks (to be abbreviated SB, hereinbelow) each having 77 bytes.

This SD-VTR is a system corresponding to three head positions and two drum rotating rates, namely, 9000 rpm (cf. FIGS. 3 and 4), and 4500 rpm (cf. FIG. 5).

At present, no specific scheme is established for recording the signal which is formed by compressing image data on the basis of the high-efficiency coding scheme standardized by the MPEG (Moving Picture Expert Group) using the tape driver, signal processor and recording and reproducing system in the aforementioned DVCR. FIG. 6 shows a structure of coding proposed as a provisional standard for the ATV (Advanced Television). In the figure, a symbol I represents a coding process within a frame, P represents a predictive coding process relative to a forward frame as an interframe coding process and B represents another predictive coding process relative to both the forward and backward frames. In the case where the video signal thus formulated based on the above interframe predicative coding is recorded as it is on the basis of the SD specifications already consented, the signal is regenerated from several different tracks as disconnected data as shown in FIGS. 7 and 8 when the system is operated in the picture search playback mode. Accordingly, it is barely possible to reproduce a complete picture with clear content.

In a case where the MPEG signal processing scheme is adopted as in the ATV, noting the fact that intraframe processed I-pictures repeatedly appear every twelfth frame, a technique in which special data prepared for the special playback is recorded in specially allotted recording areas has been disclosed in a Technical Report vol. 17 No. 59 of The Institute of Television Engineers of Japan. This method however requires a considerable amount of data for reproducing I-pictures for the ATV as will be shown hereinbelow.

Consider a case where I-pictures are recorded with a reduced quality of image equivalent to that of the NTSC or less, for example, where only DCT coefficients for d.c. components which exist one for each DCT block of 8×8 pixels are used. In this case, suppose that the number of valid samples is 1,920; the number of valid scan lines is 1,080, therefore the blocks amounts to 32,400. When only d.c. components which exist one for every 64 components of each DCT are transformed into 8-bit data, the amount of data to be recorded totals to 32,400 bytes. In addition, if four bits are allotted for each of the remaining coefficients for a.c. components, another data of 1,020,600 bytes is required since each DCT block has 63 a.c. components. In other words, use of the a.c. coefficients bulks required data amount up to about 32 times. On the other hand, actually available data amount in the search playback mode depends on the recording system and the type of the recorded signal used. As an example of the ATV, if transmitting packets are transmitted at a rate of 19.3 Mbps and the rotating rate of the head is set up to be 150 rps, each track needs to have a data recording area of 105 SBs in order to completely record the transmitting packets. Accordingly, 30 SBs can be allotted as the data recording area for data in the search playback mode and therefore the total allowable data-recording area for the I-pictures of the ATV signal periodically appearing every twelfth frame amounts to 3600 SBs. Recording only d.c. components of the I-picture requires 421 SBs, which corresponds to about one-eighth of the allowable data-recording area while recording of eight a.c. coefficients for every DCT block requires further 3366 SBs.

Since the SD-VTR video signal has a recording capacity of 24,948 Mbps while the ATV bit stream is composed of about 19.3 Mbps, it is possible to record data for special playback into separate areas from those for normal playback data. That is, the remaining part of 5.648 Mbps can be used for the data areas for special playback.

Several tape speed modes are required for effecting special playback. Therefore, it is impossible to reproduce high-quality pictures in all the tape-speed modes. Specifically, the system in the current technology, is barely able to record d.c. components of the data which is recorded at a double or triple speed, causing generation of very noticeable block warp or distortion.

Further, as the tape speed for special playback increases, it becomes necessary to duplicately record the identical data across some or several tracks in consideration of the smoothness of servo lock. That is, as the tape speed increases, the number of duplication increases. Accordingly, the higher the tape speed is, the more increased the amount of invalid data or the less the amount of data to be useful during reproduction becomes.

In view of the mechanism accuracy or the like, the amount of data usable for special playback speed modes decreases. Accordingly, only d.c. components of DCT coefficients can be recorded.

As stated in the foregoing description, as to the data to be recorded in the data areas for special playback, identical data should be recorded duplicately, such that the amount of data recordable decreases. As a result, only d.c. components of DCT coefficients are recorded, whereby distortion of DCT blocks is made conspicuous in the visually observable picture.

It seems that the data can uniformly be rounded off in its least significant bit, in order to lessen the amount of data to be recorded. This, however, not only deteriorates the shape and appearance of objects in a picture, but also significantly changes the color tones of certain kinds of pictures into those of quite another thing.

In view of the various foregoing problems, the present inventors have already proposed U.S. Ser. No. 08/444,731 and U.S. Ser. No. 08/495,025 in order to provide digitally recording and reproducing apparatuses which each are able to reproduce high-quality images in the search-playback mode even if both the intraframes and the interframes are encoded based on the high-efficiency coding scheme. Specifically, the former is constructed such that, in order to increase readable data or in order to make the best use of limited recording areas, the appearing cycle of data and tape pattern is set up at 30 tracks and such that variable-speed playback data for 3x-speed, 5x-speed and 15x-speed modes can be shared by elaborately arranging the tape pattern. The latter proposal is to realize easy editing and insert-recording operations by adaptively varying the data amount for variable-speed playback in conformity with variable-length data.

SUMMARY OF THE INVENTION

In order to solve the conventional problems described above, it is therefore an object of the present invention to provide a digitally recording and reproducing apparatus in which video data for variable-speed playback to be recorded is formed by extracting part of the video data used for variable-speed playback in such a manner that the amount of a reproduced picture at the variable-speed mode is improved from the peripheral part of the reproduced image toward the central part thereof, or in such a manner that the playback picture at the variable-speed mode is improved as the variable-playback speed becomes lower or as the change or movement of the picture becomes slower. That is, the present invention is to reduce the amount of data for variable-speed playback without lowering the visual grade of image quality by improving the quality of image in the important portion in the image where the viewer's attention is drawn upon.

Gist of the invention resides in that a digitally recording and reproducing apparatus records a desired video signal onto a recording medium by compressing the band range of the desired video signal using a high-efficiency coding technique and has a means for recording part of video data for variable-speed playback onto different recording tracks from those on which video data for normal playback is recorded, and comprises: a means for forming video data for variable-speed playback to be recorded by extracting part of the video data for variable-speed playback in such a manner that the amount of a reproduced picture at the variable-speed mode is improved from the peripheral part of the reproduced image toward the central part thereof.

It is effective either that the digitally recording and reproducing apparatus having the above configuration further comprises a means which, in a case where the discrete cosine transform is used to compress the band range of the video signal, allots only the d.c. component or part of the d.c. component to data for an outermost part of the image frame of a reproduced picture at the variable-speed playback mode and allots a.c. components to data for an inner part of the image frame of the reproduced picture, in such a manner that the amount of the a.c. components is increased toward the central part of the image frame; or that the digitally recording and reproducing apparatus having the above configuration further comprises a means which, in a case where the variable-speed playback operation is effected at multiple steps of speed, extracts part of the video data and is adapted to increase the amount of the extracted part as the speed of variable-speed playback decreases, to form the video data for variable-speed playback to be recorded.

Any of the following features is effective in the digitally recording and reproducing apparatus having any of the above configurations. That is, the digitally recording and reproducing apparatus further comprises a means which, in a case where the variable-speed playback operation is effected at multiple steps of speed, forms the video data for variable-speed playback to be recorded, such that part of the video data recorded on the recording medium can be shared between different playback speed modes. Or, in the above digitally recording and reproducing apparatus, when part of the video signal whose necessary band range has been compressed is recorded as data for variable-speed playback, the amount of a.c. components (high-frequency components) of data on the outermost part of the frame of a reproduced picture is reduced if the reproduced picture changes fast and the amount of the a.c. components is increased as change of the reproduced picture becomes slow. Alternatively, in the above digitally recording and reproducing apparatus, when part of the video signal whose necessary band range has been compressed is recorded as data for variable-speed playback, the least significant bits of data on the outermost part of the frame of a reproduced picture is abandoned if the reproduced picture changes fast and the least significant bits are added one by one to increase gradations as change of the reproduced picture becomes slow.

Further, it is effective in the digitally recording and reproducing apparatus having any of the above features, that when part of the video signal whose necessary band range has been compressed is recorded as data for variable-speed playback, different conditions are separately set up for the luminance signal and two kinds of chrominance signals or the three color signals, and as to each of the three signals, a means which extracts video data for variable-speed playback is set up in combination. Alternatively, it is also effective in the digitally recording and reproducing apparatus having any of the above features, that in the case where a first image for variable-speed playback consisting of one frame is displayed for the duration of some or several frames and a second image for variable-speed playback of a next frame is displayed, succesively and repeatedly, in order to display the two frames that are made from each field of one frame, repeatedly in a specified displaying duration and the method of forming two frames from one frame can be selected depending on the position of the image and the moving amount of images, from two schemes: a first of which is that two fields are converted into two frames by converting field data by every DCT block of an image or by every macro block consisting of a plurality of DCT blocks, into frame data; and a second of which is that one frame is converted into two frames by merely repeating the frame by itself.

In the above case, the following three means are used in combination to maintain the quality of image in an important part in the picture with using a limited amount of data. That is, the first means is to increase the number of DCT coefficients of data for variable-speed playback stepwise so that the reproduced picture at the variable-speed mode is improved from the peripheral part of the reproduced image toward the central part.

The second means is to reduce the number of a.c. components recorded, in association with the movement or change of the picture. Specifically, sensitivity of the human's eyes is low to the objects moving sharply and the actual definition of the picture on the monitor declines due to the lowerness of the time response of the camera etc., and due to the influence of residual images on the monitor. Taking advantage of such defective features, the second means reduces the amount of data for variable-speed playback without degrading the quality of the visually observable picture.

The third means is to reduce the amount of data without degrading the quality of the picture, by rounding off the least significant bits of data in the peripheral part of the image or in the portion where the reproduced picture moves fast. Further, in the case where one frame of variable-speed playback images is repeatedly displayed in the duration of about two-frame equivalent, the picture becomes unnatural if fields containing a time-lag therebetween are alternately displayed. In such a case, it is possible to create a naturally animating picture by creating respective new frames from first and second fields and alternately displaying the thus created two frames.

DESCRIPTION OF THE PREFERRED EMBODIMENTS

Embodiments of the present invention will hereinafter be described in detail with reference to the accompanying drawings.

A first embodiment of the invention will be explained using ATV bit streams as an example of input signal and a SD-VTR as an example of VTR. It is noted, however, that input signal as well as VTR is not limited to those above. In the ATV, the DCT technique is used to compress band widths of video signals.

In this first embodiment, it is possible to set up multi-level areas such that the reproduced image quality during the variable-speed playback mode is improved stepwise from the peripheral part of the reproduced image toward the central part thereof. In the following description, the simplest example will be taken, such as when the reproduced image quality is changed in two steps.

Figure 1:
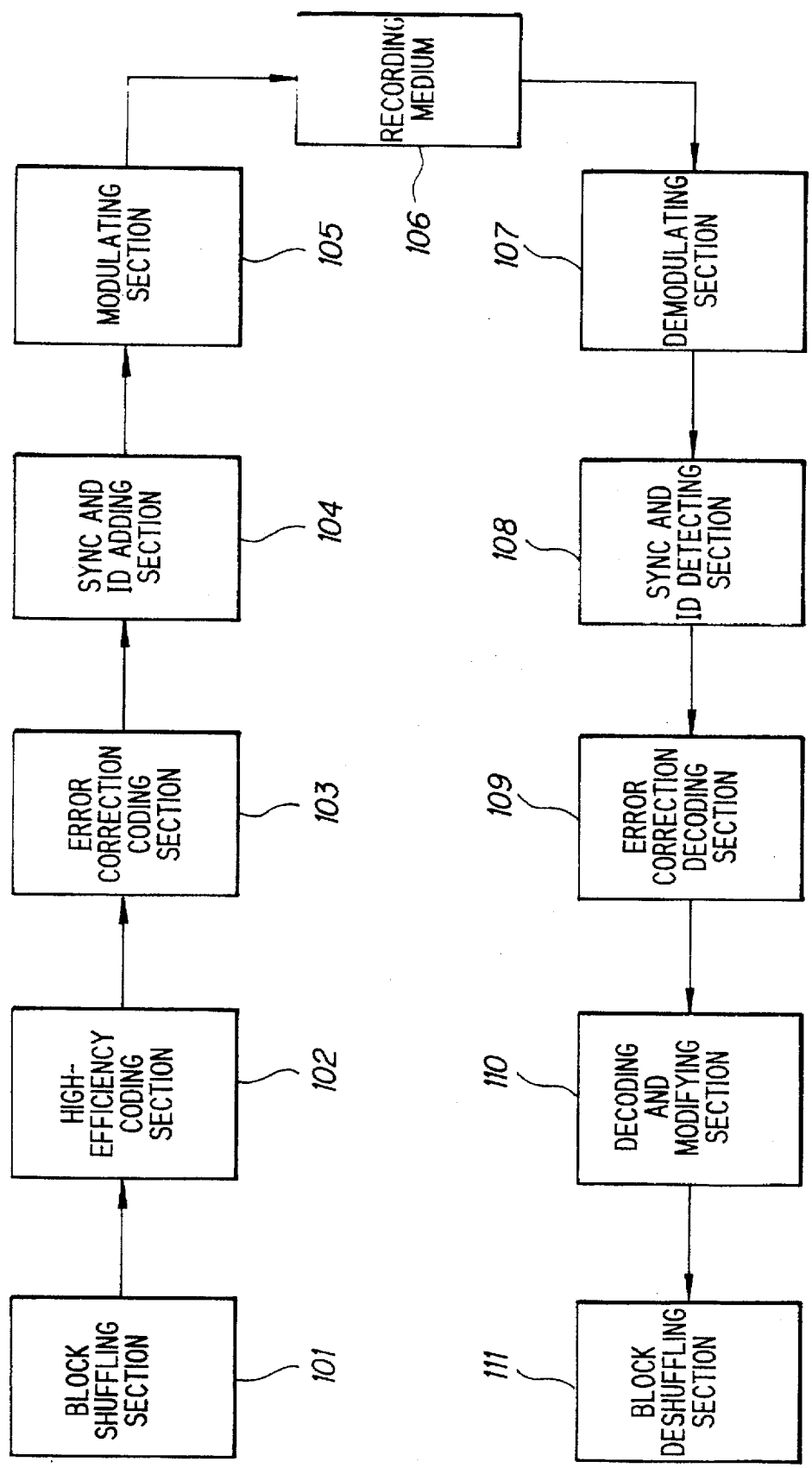
FIG. 1 is a circuit block diagram of a prior art SD-VCR.
Figure 2:
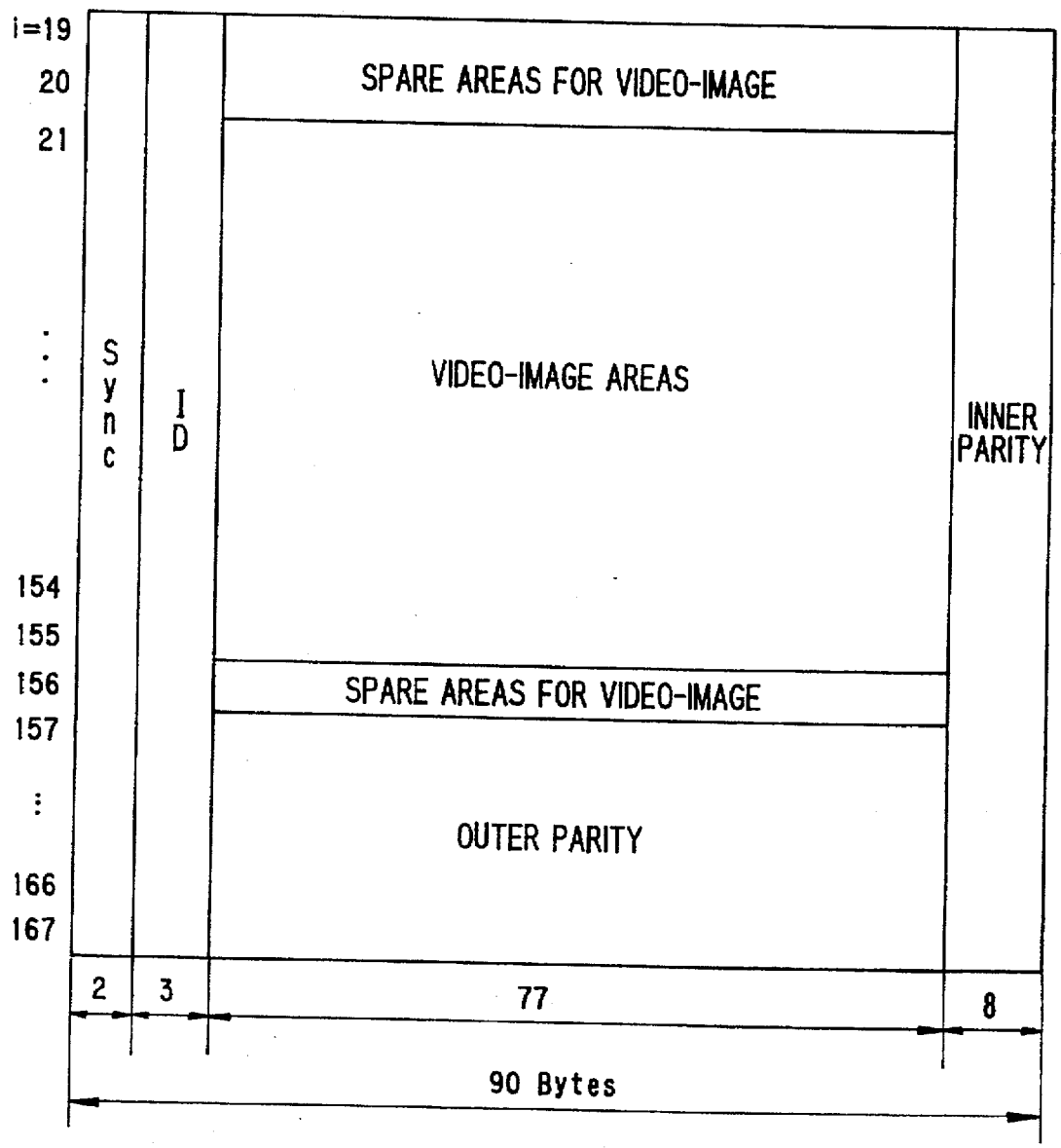
FIG. 2 is a structure of SBs of a prior art SD-VCR.
Figure 3:
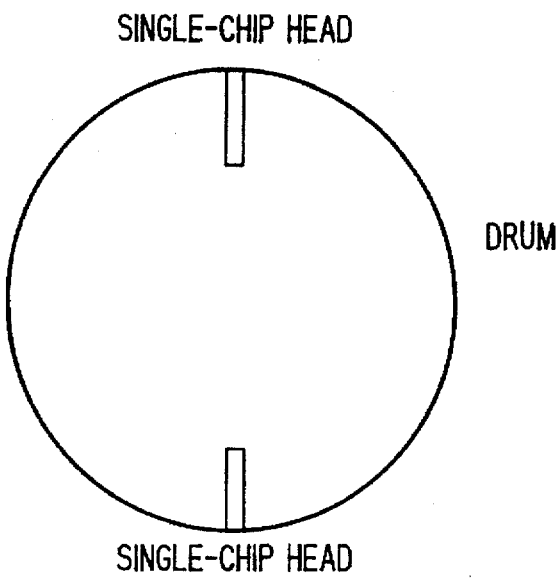
FIG. 3 is a view showing a head arrangement of a first kind, to which the SD-VCR system is responsive.
Figure 4:
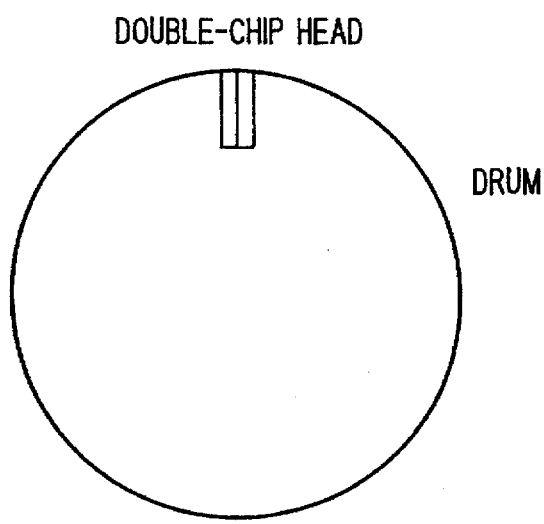
FIG. 4 is a view showing a head arrangement of a second kind, to which the SD-VCR system is responsive.
Figure 5:
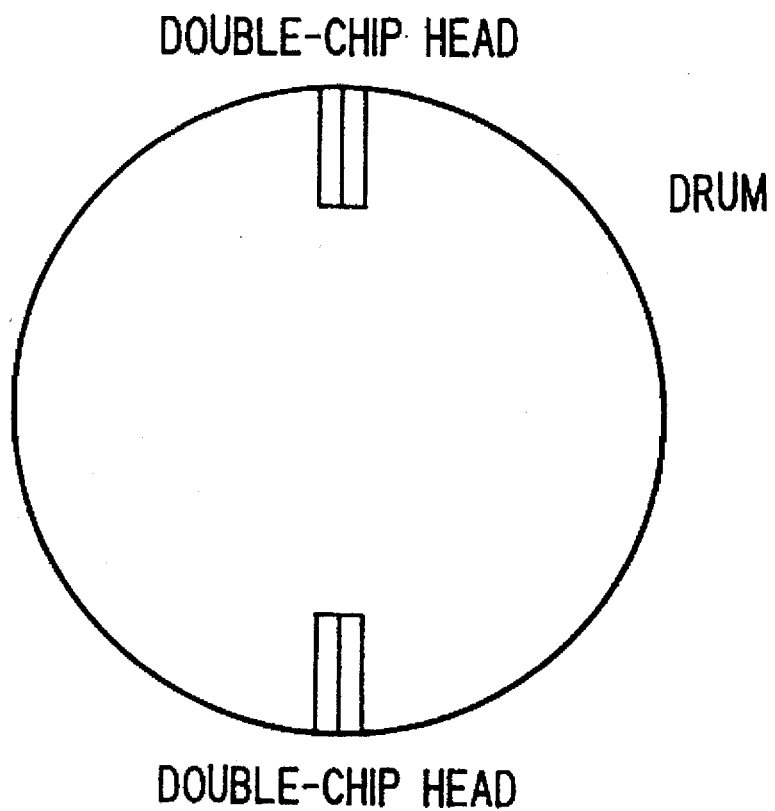
FIG. 5 is a view showing a head arrangement of a third kind, to which the SD-VCR system is responsive.
Figure 6:
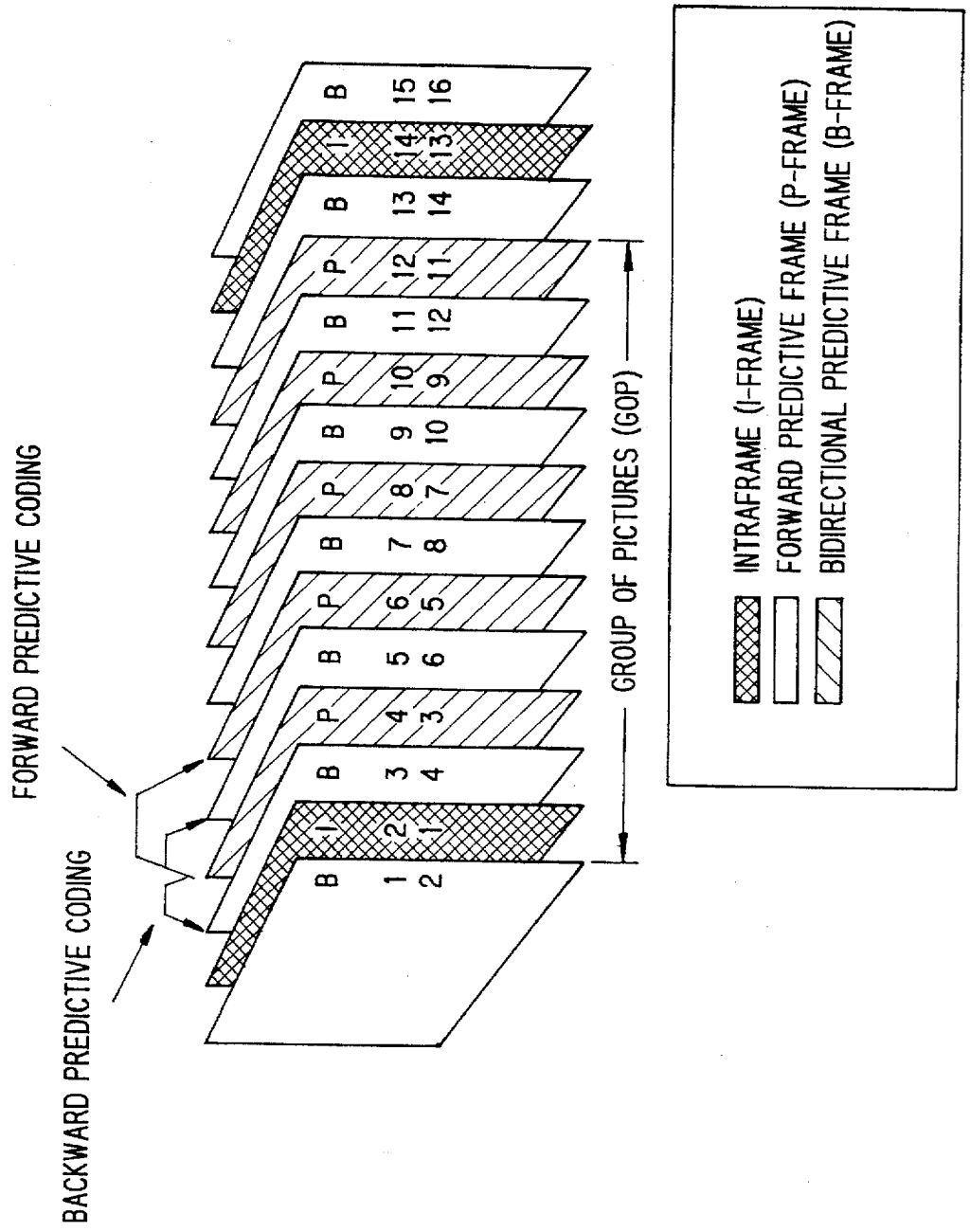
FIG. 6 is a view showing a frame structure of a packet for ATV.
Figure 7:
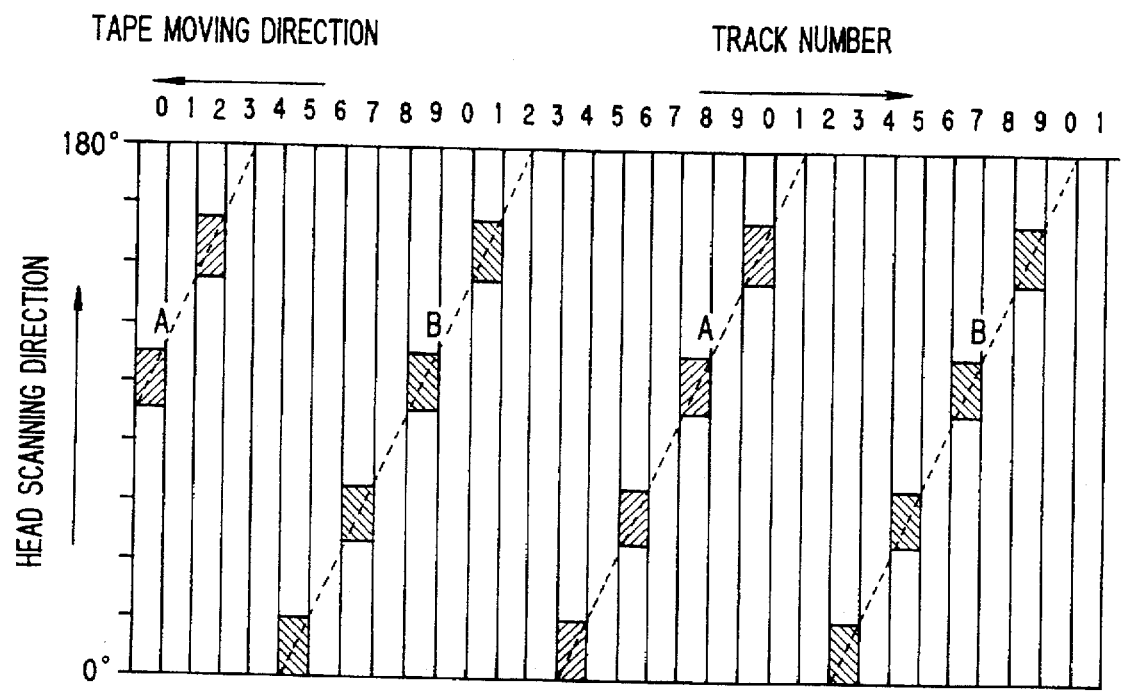
FIG. 7 is a chart showing an example of search-playback in 9x-speed mode in a prior art configuration in which a pair of single chip heads are used (arranged in radially opposite positions)
Figure 8:
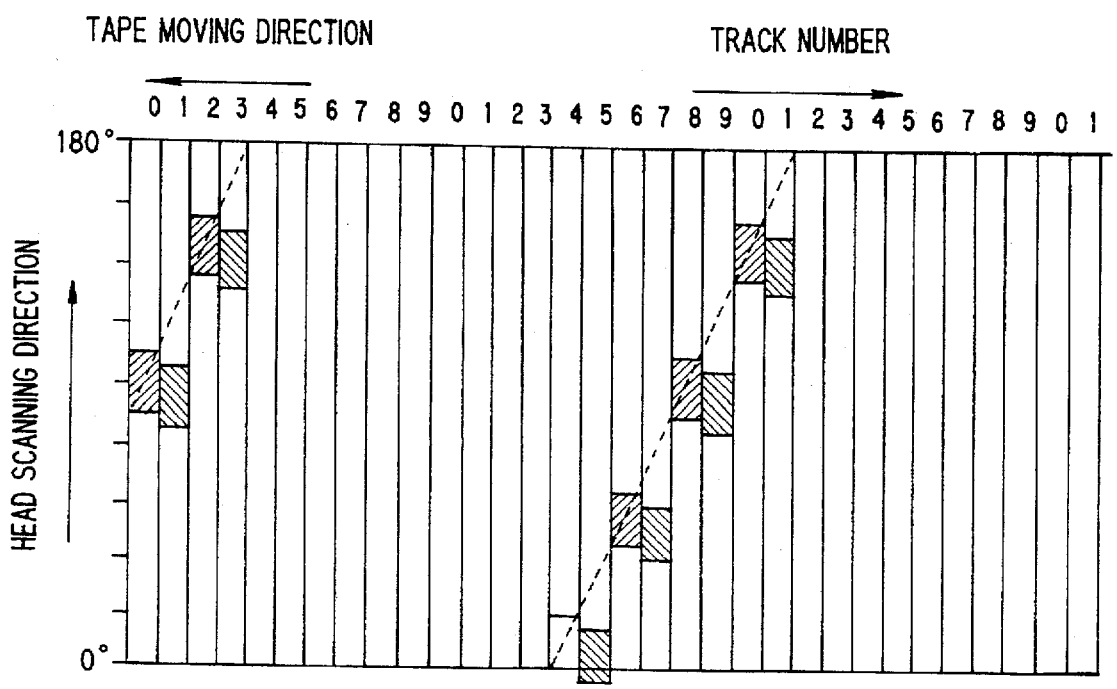
FIG. 8 is a chart showing an example of search-playback in 9x-speed mode in a prior art configuration in which a double chip head is used.
Figure 9:
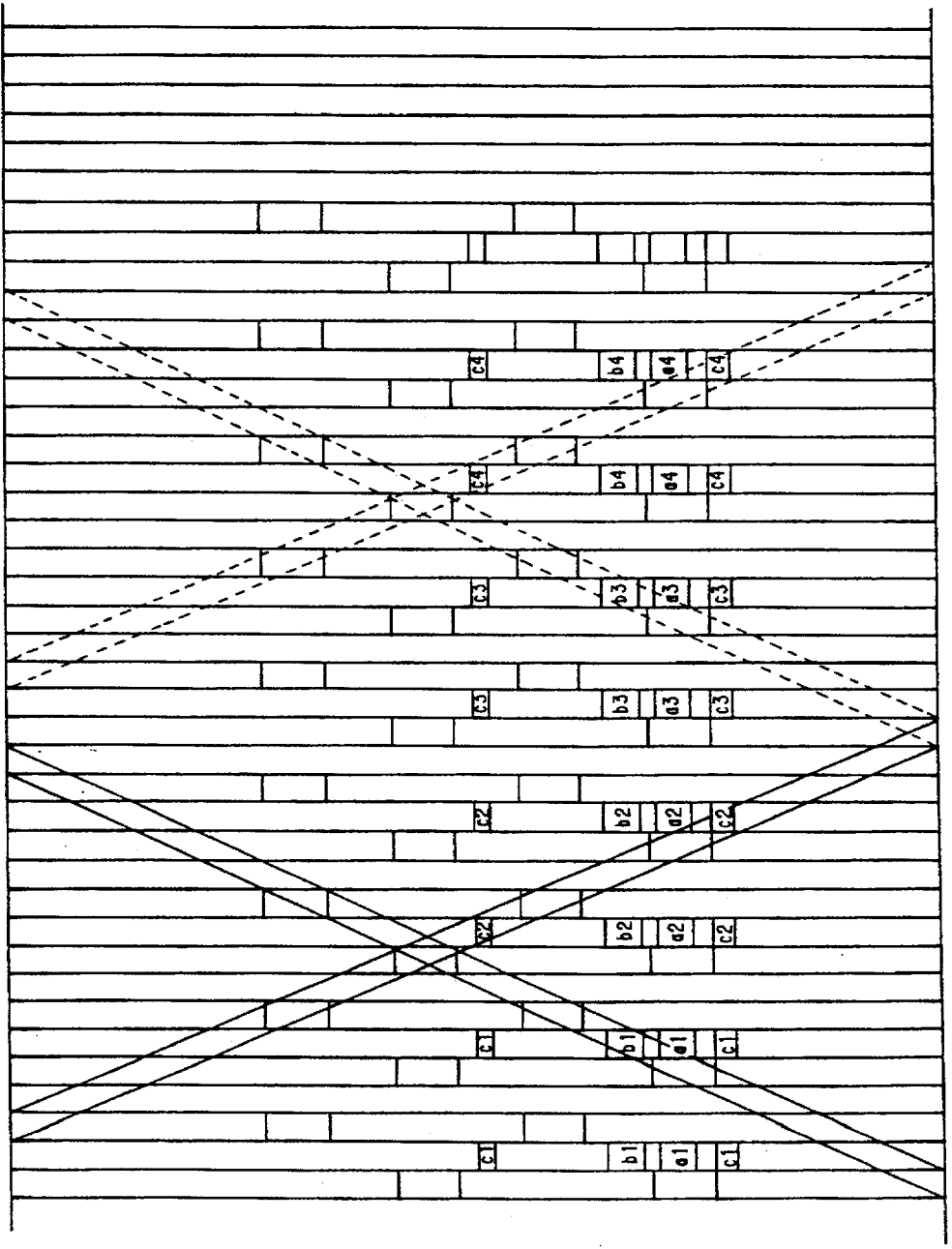
FIG. 9 is a chart showing data allocation when part of data for 4x-speed playback is used for reproducing at the 16x-speed playback mode.

It is also possible to set up multi-level variable speed. Two levels of speeds, that is, 4x- and 16x-speed modes are taken for the following example. In the above condition, a tape pattern shown in FIG. 9 is used as an example. Tape patterns to be used are limited by a variable playback-speed set up, but the present invention is applicable to a system having any variable-speed with any tape pattern used.

Since the SD-VTR video signal has a recording capacity of 24.948 Mbps while the ATV bit stream is composed of about 19.3 Mbps, a space of about 5.648 Mbps remains in the recording region on the tape. This remaining part is used to record data for variable-speed playback. FIG. 9 shows a tape pattern in which patterns each consisting of four tracks are periodically repeated. Each four-track has 37 SBs (containing area a1 in FIG. 9 and not containing areas b1 and c1) of data for 4x-speed playback and 48 SBs of 16x-speed playback. The latter is separately distributed in four areas. These recording areas are arranged such as to be responsive to the double-azimuth head arrangement or 180° opposing head arrangement, with drum rotational frequencies of 9000 rpm and 4500 rpm. Data for 4x-speed playback is duplicately recorded on another track so that the number of head traces on the data may be increased. Similarly, data for 16x-speed playback is duplicately recorded eight times on different tracks. As a result, the pattern of data is repeated in a cycle of 32 tracks. Areas a, b, c with an identical subscript in FIG. 9 indicate that those areas have the same data content although recorded in different sites.

Other than the above recording data, 9 SBs in 32 tracks are taken to record other utility data than the variable-speed playback data, and 12 SBs in 32 tracks are ensured in both sides of the tape to repeatedly record the data written on the other side so that the reproduction can be effected exactly even if the tracking accuracy and mechanical accuracy are low in view of the interchangeability. Fourteen SBs (areas b1 and c1 in FIG. 9) in 32 tracks are recording areas secured to be used for the invention. This will in detail be described hereinbelow. Thus, the amount of the data is calculated as follow:

$$37+48+9+12+14=120 \ SBs$$

$$120 \times 300/4 \times 77 \times 8 = 5.544 \ Mbps.$$

Since the data amount is less than 5.648 Mbps, these data can be recorded in the SD-VTR together with the whole ATV bit stream. The remaining area can be a margin for fluctuation of the input data.

As shown in FIG. 9, in the present invention, 7 SBs (the area a1 in FIG. 9) of the data for 4x-speed playback are also used when the data is reproduced for 16x-speed forward playback by the double azimuth 2-head arrangement with a rotational frequency of 9000 rpm. The data in the same recording area can also be used for 16x-speed reverse playback by the double azimuth 2-head arrangement with a rotational frequency of 9000 rpm.

In order for the tape pattern to be responsive to other head arrangements, specifically, the 180° opposing 2-head arrangement with 9000 rpm or the 180° opposing 4-head arrangement with 4500 rpm in 16x-speed forward and reverse playback modes, the aforementioned data of 7 SBs are required to duplicately be recorded in other two sites (areas b1 and c2 in FIG. 9) within the same four tracks.

In general, if the data is not used commonly, 28 SBs are required in order to make the tape pattern responsive to the variable-speed playback mode. In contrast, if the tape pattern shown in FIG. 9 of the invention is applied, increment of only 14 SBs of data areas is enough to achieve the same effect.

When the total recording area to be used on the tape is assumed to be the same in both the conventional tape pattern and the tape pattern of the invention, the data amount actually picked up in 16x-speed playback mode is calculated as follows:

That is, since in the 16x-speed playback mode to which the present invention is not applied, the 14 SBs of recording areas which can be added should be allotted to the four sites for the forward and reverse variable-playback in two different head arrangements, the data amount picked up from the conventional tape pattern is calculated as $$(48+14/4) \times 77 \times 8 \times 150 = 4.7586 \ Mbps.$$

In contrast, when the data is commonly used as described above, the data amount picked up from the tape pattern of the invention is calculated as $$(48+7) \times 77 \times 8 \times 150 = 5.082 \ Mbps.$$

In the above example, 14 SBs and 7 SBs are the lowest possible data amounts which are estimated to be reproducible during crossing one track in 16x-speed playback mode, in consideration of the interchangeability. Accordingly, if the setup conditions such as the speed of variable-playback and mechanical accuracy and assembling dispersion are changed, the number of SBs of the data should be modified.

Figure 10:
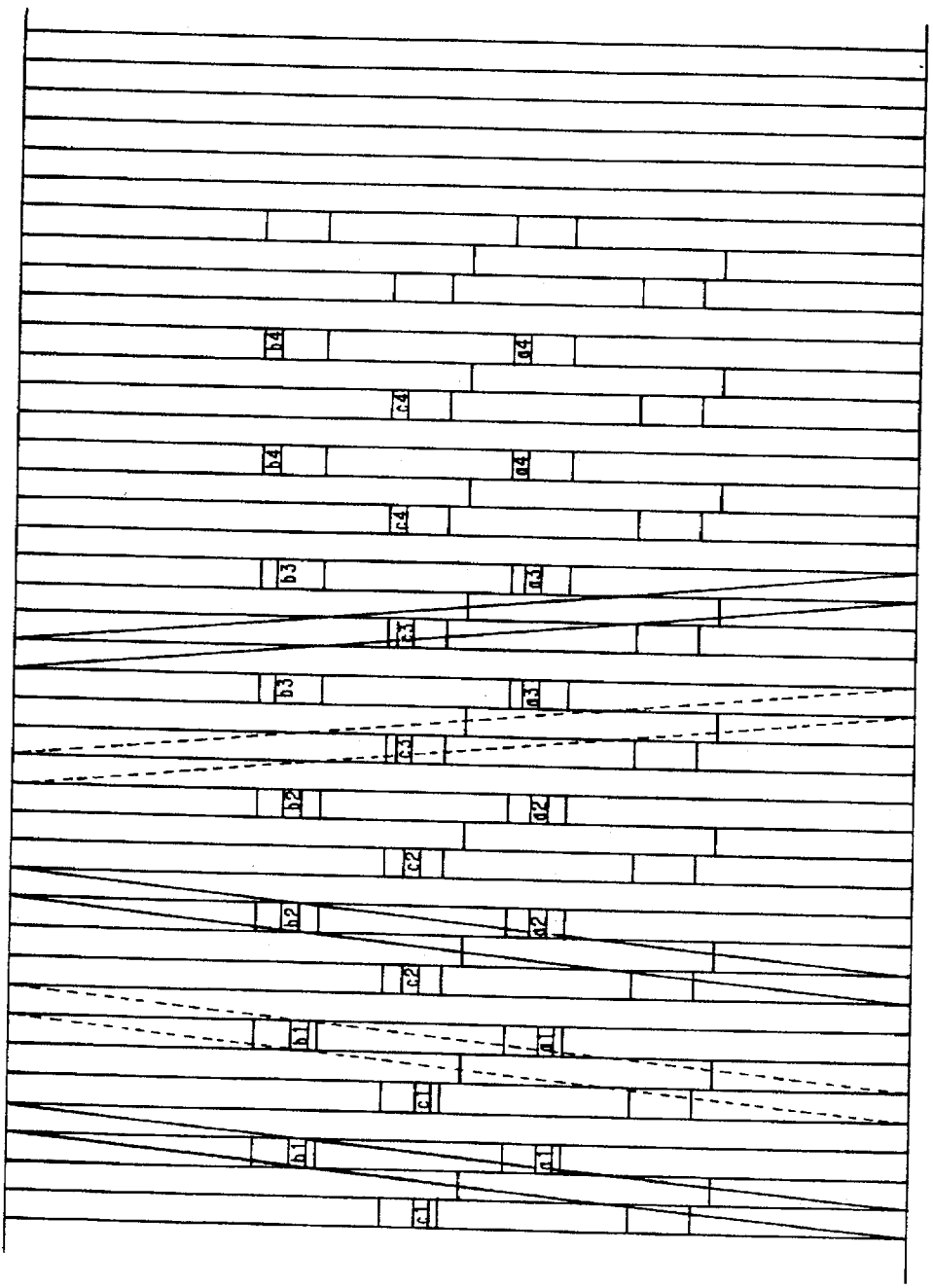
FIG. 10 is a chart showing data allocation when part of data for 16x-speed playback is used for reproducing at the 4x-speed playback mode.

In this example of the tape pattern, part of the data for 16x-speed playback may also be used as the data for 4x-speed playback, as shown in FIG. 10. It is also possible to create a tape pattern such that part of the data for 16x-speed playback may be used commonly as the data for 4x-speed playback and at the same time, part of the data for 4x-speed playback may also be used as the data for 16x-speed playback.

Figure 11:
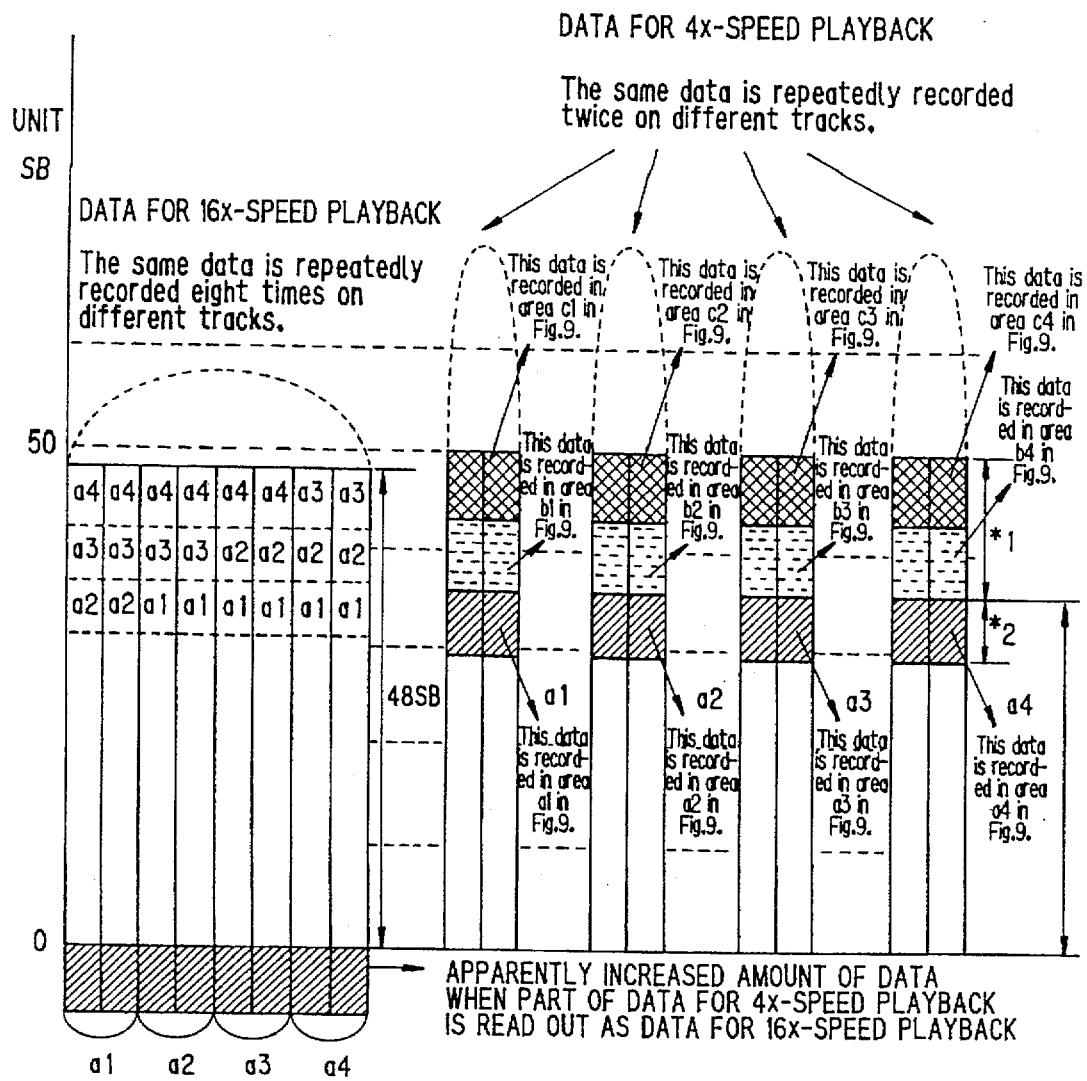
FIG. 11 is a graph showing the amount of data when part of data for 4x-speed playback is used for reproducing at the 16x-speed playback mode.

Now, description of the invention will be made on the method of forming a tape pattern by repeating data, in order to deal with the two kinds of the head arrangements as stated above. Data for 4x-speed playback and data for 16x-speed playback, created from one I-picture are both recorded in a range of 300 tracks. (Data on the next I-picture is recorded on next 300 tracks.) Initially, when part of data for 4x-speed playback is used as the data for 16x-speed playback, data in the area a1 in FIG. 9 is repeatedly recorded in areas b1 and c1 in FIG. 9. Since contents of data for 4x-speed playback change by every four tracks within 32 tracks, this situation is represented by using subscripts. Specifically, data in area a2 in FIG. 9 is repeatedly recorded in areas b2 and c2 in FIG. 9. In the same manner, a3 and a4 are repeatedly recorded in areas b3, c3 and b4, c4, respectively. Accordingly, if the present invention is not applied to, the identical data for 16x-speed playback should repeatedly appear eight times or within a range of 32 tracks. However, since in the data arrangement of the present invention, the contents of the data to be shared change within the range of 32 tracks, it is necessary to modify part of the shared data so as to conform with the data required for 16x-speed playback. FIG. 11 shows a chart showing the data amount of these data.

Conversely, when part of data for 16x-speed playback is used as the data for 4x-speed playback, data to be shared in the area a1 in FIG. 10 is repeatedly allotted to areas b1 and c1. When contents of data for 4x-speed playback change within 32 tracks, data in the area a2 is repeatedly allotted to areas b2 and c2. In the same manner, a3 and a4 are repeatedly allotted in areas b3, c3 and b4, c4, respectively.

To sum up, data in both 4x-speed and 16x-speed playback modes, periodically appearing in the cycle of 32 tracks, correspond to the same position in the picture, while the data in 4x-speed and 16x-speed playback modes, appearing in the cycle of 4 tracks correspond to different positions in the picture. Therefore, when part of data in one mode is shared, the data should be rearranged so as to be used as data in the corresponding speed mode or the other mode and it is therefore necessary to repeatedly record the data to deal with rearrangement. In the case where data for 4x-speed playback and data for 16x-speed playback, both created from the same I-picture are recorded in different ranges on the tape, it is impossible to reconstruct a picture in one of the two playback modes using data for the other mode read out from the data recording areas for the other speed mode. As stated above, the data must be rearranged to reconstruct a picture since the data in different playback modes do not always correspond to the same positions in the picture. At the moment, there occurs lack of data for the reconstruction because the recorded ranges of the data are different. A specific example of the above is a case where data for 16x-speed playback is recorded in a range of 300 tracks while data for 4x-speed playback is recorded in a range of 150 tracks. In such a case, the aforementioned sharing of data cannot be done in 150 tracks where the data for 4x-speed playback and the data for 16x-speed playback represent different image frames or image fields. More specifically, the data is shared in the first 150 tracks within the 300 tracks but is not shared in the second 150 tracks. Here, it is noted that the position of 150 tracks in which the sharing of data is made is not necessarily limited to the first 150 tracks.

In the above case, data in the area a1 is repeatedly recorded in areas b1 and c1 by taking two kinds of the head arrangements into account. In such a case, when the tape is reproduced in a variable-speed playback mode in one of the head arrangements, data for the other head arrangement cannot be used. This means that, if the kinds of the head arrangements to which the tape pattern should be responsive are reduced in number, the unused areas can be reduced. Consequently, it is also possible to increase the amount of data to be effectively used if the tape pattern is set up to be responsive to only a specific head arrangement.

The tape pattern of the invention must be designed by comprehensively examining how big the recording area for data in the variable-speed mode can be ensured; how the image quality in the variable-speed mode is improved as the amount of data readable increases; and how big the unusable part is. In the case where the present invention is applied to as in the above example, it is possible to utilize many coefficients of a.c. components, especially, for the data in the 16x-speed playback mode, whereby there is a greatest advantage that the image quality in the 16x-speed playback mode is markedly improved.

Next, the structure of data when recorded in the invention will be described. Although description will be made as to the above example of the invention, the structure of data of the invention can similarly be applied to a case to which the above configuration of the invention is not applied. Conversely, the data structure to be used in the above example should not be limited to the data structure as will be described.

Data to be recorded is formulated from I-pictures alone. There can be assumed to be one I-picture in every 10 to 20 frames. Now, explanation will be made on a case where one I-pictures appears in every 15 frames. It is also assumed that there are three frames between I- and P-pictures.

Although the total amount of data as to d.c. coefficients for DCT blocks in one I-picture differs depending on the type of image and also depending on the setup condition of the encoder used, the number of data on average is assumed to be about 24 Kbytes, for example.

In this condition, the recording capacity of data for 16x-speed playback during 15 frames (on 150 tracks) in recording can be calculated as follows:

$$(48+7) \times 77 \times 150/32 = 19.85 \text{ Kbytes}.$$

In the case of the 16x-speed playback mode, d.c. coefficients for one I-picture are recorded during 30 frames. As a result, the information about I-picture is recorded in a range of 300 tracks while one frame every two I-pictures is abandoned. In this case of the 16x-speed playback mode, since the head picks up the information as crossing 160 tracks in the duration of one frame, one I-picture data for the variable-speed mode are picked up in the duration of (15× 2)/16 frames. Accordingly, the data for 15/8 frames should be held per one I-picture. In practice, two frames per seven I-pictures are held for display and then the next I-picture is displayed only in the duration of one frame. Thus, the process is simplified when the time of data holding is set up at a multiple of the duration of one frame.

Since some part remains in the recording area as the data is recorded in the manner above, a.c. coefficients are recorded in the remaining part. Although the total amount of data as to a.c. coefficients when one a.c. coefficient is allotted to each of DCT blocks in one I-picture differs depending on the type of image and also depending on the setup condition of the encoder used, the number of data on average is assumed to be about 16 Kbytes. The coefficients of chrominance signals are made not to be recorded and the coefficients of the luminance signal Y for pixels from the peripheral part of the screen to one-third of the screen are made not to be recorded. In this condition, two a.c. components of the luminance signal Y for pixels in the central ⅔ part of screen can be recorded as indicated by the following expressions:

$$16 \times 2 \times (\tfrac{2}{3}) \times (\tfrac{4}{6}) = 14.2 \text{ Kbytes}$$

$$24 \text{ Kbytes} + 14.2 \text{ bytes} = 38.2 \text{ bytes} < (19.85 \times 2) \text{ Kbytes} = 39.7 \text{ Kbytes}.$$

When the image changes or the setup condition of the encoder changes, no problem occurs as long as the variation or increment of data is not more than 1.5 Kbytes. If the amount of data increases by 1.5 Kbytes or more, area in which the a.c. components of the luminance signal Y are not recorded may be enlarged to lessen the total amount of the data. When the amount of data decreases, no problems occur if blank area may be increased simply.

Figure 12:
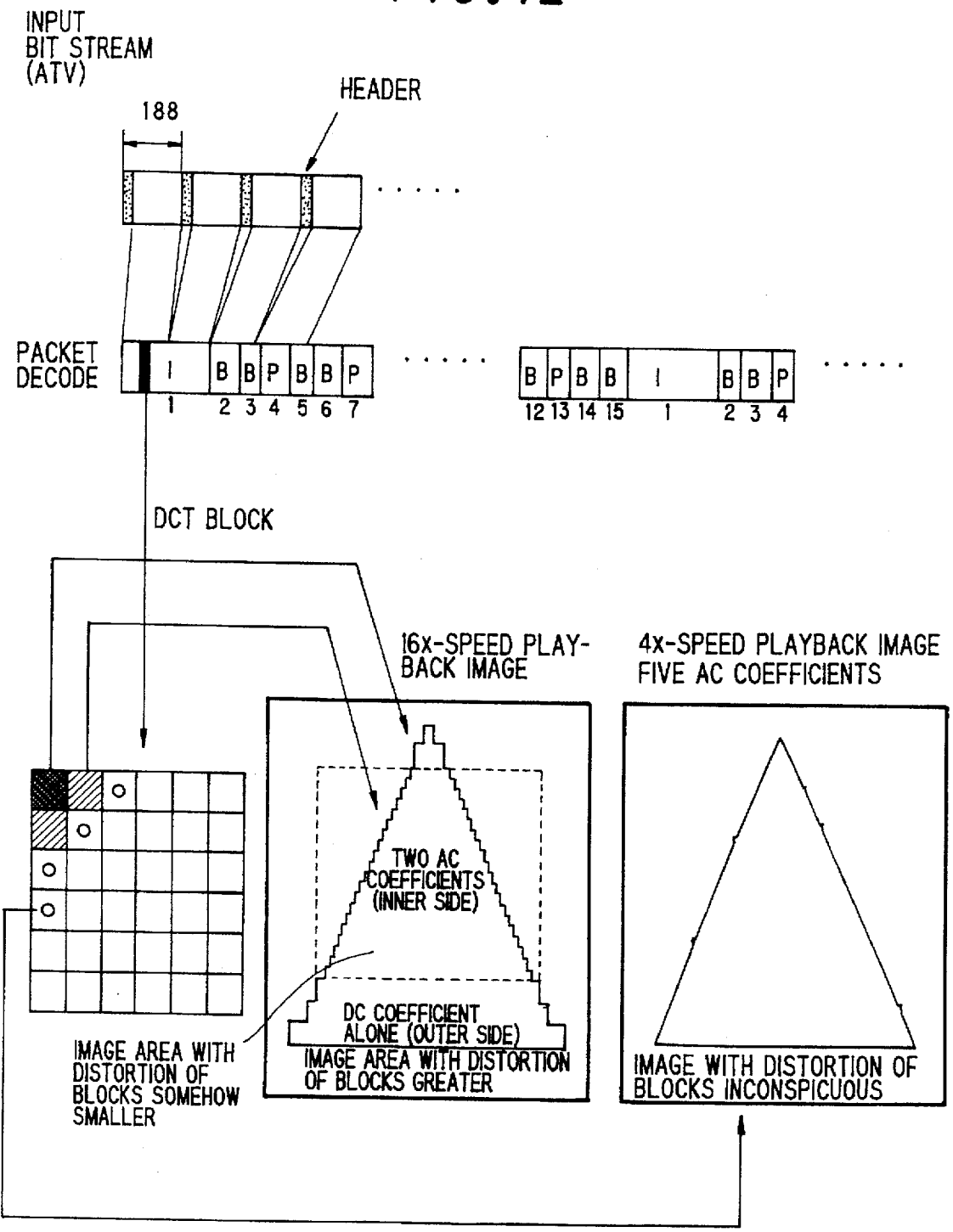
FIG. 12 is an illustrative view showing a method of reducing the amount of data by changing the quality of image at the variable-speed playback mode, depending on the image regions.

Since partitioning of the screen area can be easily done based on the unit of macro blocks (which will be abbreviated hereinbelow as MBs and each consist of 16×16 samples, four DCT blocks of the luminance signal Y and two DCT blocks of the chrominance signals), ten MBs on each side of the screen and six MBs on each of upper and lower sides of the screen are determined as a peripheral frame in which only d.c. coefficients of the luminance signal Y and the chrominance signals are to be recorded (FIG. 12).

At this moment, the amount data is represented as follows:

$$16 \times 2 \times (555/8100) \times (4/6) = 14.62 \text{ Kbytes.}$$

The above area may be set up based on the unit of DCT blocks. There is little difference between the case where the area is set up based on MBs and the case where the area is set up based on DCT blocks. In the latter case, the amount of data can be adjusted in a slightly minute manner, but the number of counters increases.

When an image is formed of d.c. coefficients alone, 8×8 block units in the image become conspicuous. In contrast, when each 8×8 block is formed of two a.c. coefficients, the block is made inconspicuous. Therefore, reconstruction of a variable-speed playback image using two a.c. coefficients greatly improves the image quality in the variable-speed playback mode. When d.c. coefficients with only one kind of a.c. coefficients are used to reconstruct an image, vertical or transversal stripes appear in the image such that little improvement of the image quality can be expected or deterioration of the visually observable image in its quality could sometimes be emphasized.

In general, most of important contents in pictures are located in the central part on the screen and the viewers' attention is also drawn on the central part of the screen. Therefore, even when the peripheral part of the image on the screen is represented using d.c. coefficients alone, it does not cause a remarkable decline in the image quality. Specifically, when the partial image in the outside area defined as stated above by 160 samples on both sides (ten MBs for each side) and upper and lower lines of 96 samples (six MBs for each line) has warp or distortion of DCT blocks, this does not cause outstanding visual deterioration. This situation is quite right especially when the holding time of one I-picture is short.

Thus, on condition that the amount of data to be used is constant, it is possible to construct an improved variable-speed picture when d.c. coefficients with two kinds of a.c. coefficients are used to construct a central part of the image of about (24+16)/(24+16+16) of the total area while the outside part of 2/7 of the total area is constructed by d.c. coefficients alone, as compared a case where d.c. coefficients and one kind of a.c. component of the luminance signal are used to construct a variable-speed playback image throughout the image frame.

An image reconstructed by a.c. components of the luminance signal with only d.c. components of the chrominance signals does not appear markedly deteriorated as long as it is visually observed quickly, as compared to the case where a.c. components of the chrominance signals are used. Accordingly, no a.c. components of the chrominance signals are used as the data for 16x-speed playback, as in the above example.

Similarly, in constructing data for 4x-speed playback, it is possible to create the data for 4x-speed playback in the form of the data structure as above. Further, even when recording areas within 32 tracks for the 4x-speed playback data and for the 16x-speed playback data substantially correspond to one another, the amount of data to be read out in the 4x-speed playback mode is about four times as much as that in the 16x-speed playback mode. Hence, it is possible to use more data to reconstruct a variable-speed playback picture. Thus, d.c. coefficients and five kinds of a.c. coefficients are used to construct a 4x-speed playback image.

In this case, the data amount on average can be as much as 24+16×5=104 Kbytes. On the other hand, when the amount of data to be written in a range of four tracks is assumed to be 37 SBs, the data amount to be written in a range of 300 tracks can be calculated as follows;

$$37 \times 4 \times 77 \times 300/32 = 106.84 \text{ Kbytes.}$$

That is, the data on average can be recorded.

If a certain I-picture contains much data, it is possible to decrease the amount of data with deterioration of the image quality in visual observation suppressed, by enlarging the outside area in which the image is reconstructed by only d.c. coefficients. Alternatively, it is also possible to reduce only the number of a.c. coefficients for the chrominance signals used while the number of a.c. coefficients for the luminance signal used being kept as they are.

When the recording area is smaller than the above embodiment, there could occur a case that the image in the peripheral frame portion must be formed of only d.c. coefficients. In such a case, the boundary between the inside and outside parts becomes conspicuous. To prevent this, another frame in which the image is composed of d.c. coefficients and two kinds of a.c. coefficients is interposed between the two parts. That is, an image is formed of three regions: the outermost part of only d.c. coefficients; the intermediate part of d.c. coefficients with two kinds of a.c. coefficients; and the central part of d.c. coefficients with five kinds of a.c. coefficients. By this data structure, it is possible to reduce the amount of data without degrading the quality of the visual observable image. In this case, the data structure of the chrominance signals may be composed of two regions: a first region of only d.c. coefficients and a second region of d.c. coefficients and five kinds of a.c. coefficients. Alternatively, the data structure of the chrominance signals may be composed in the same configuration as in the luminance signal. Further, partitioning of the areas can be made different from the case of the luminance signal.

In the above example, although one I-picture was assumed to contain, on average, 24 Kbytes of d.c. coefficients while one a.c. coefficient was assumed to be 16 Kbytes, the amount of data as to a certain I-picture may exceed the above-specified data amount above due to the use of the length-variable coding. In this case, the amount of data is decreased by lowering the quality of image in the peripheral area of the image as stated above while the quality of the visually observable image is inhibited from degrading, thus making it possible to control the amount of data to the specified data amount. This operation makes it possible to record the data for variable-speed playback within a range of 300 tracks and therefore allows easy editing.

Next, explanation will be made of how to display variable-speed playback pictures. In the 16x-speed mode, seven frames of pictures are repeatedly displayed during a two-frame period and a next frame of picture is displayed during only one-frame period. In this period, since a plurality of fields which each contain a time lag from the other fields are alternately displayed to create animated pictures, the movement of pictures becomes unnatural.

Figure 13:
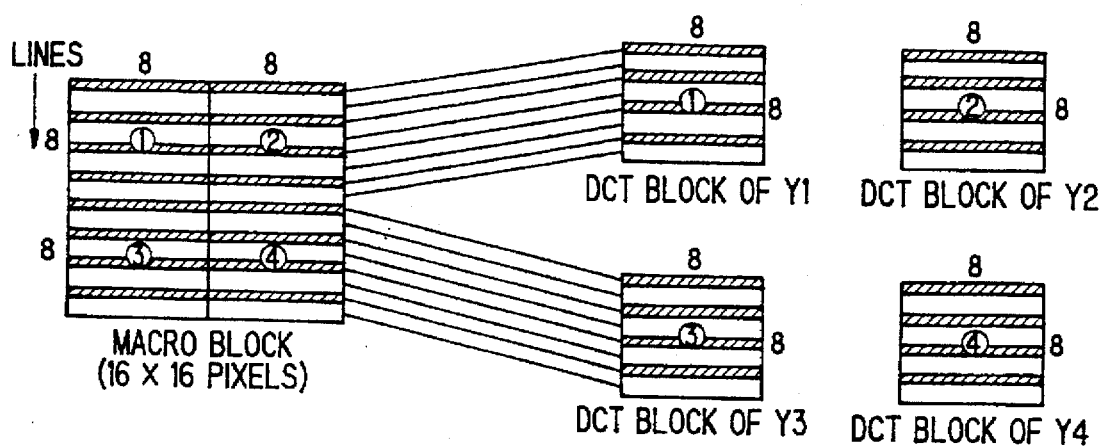
FIG. 13 is an illustrative view showing a structure of data of a frame DCT.
Figure 14:
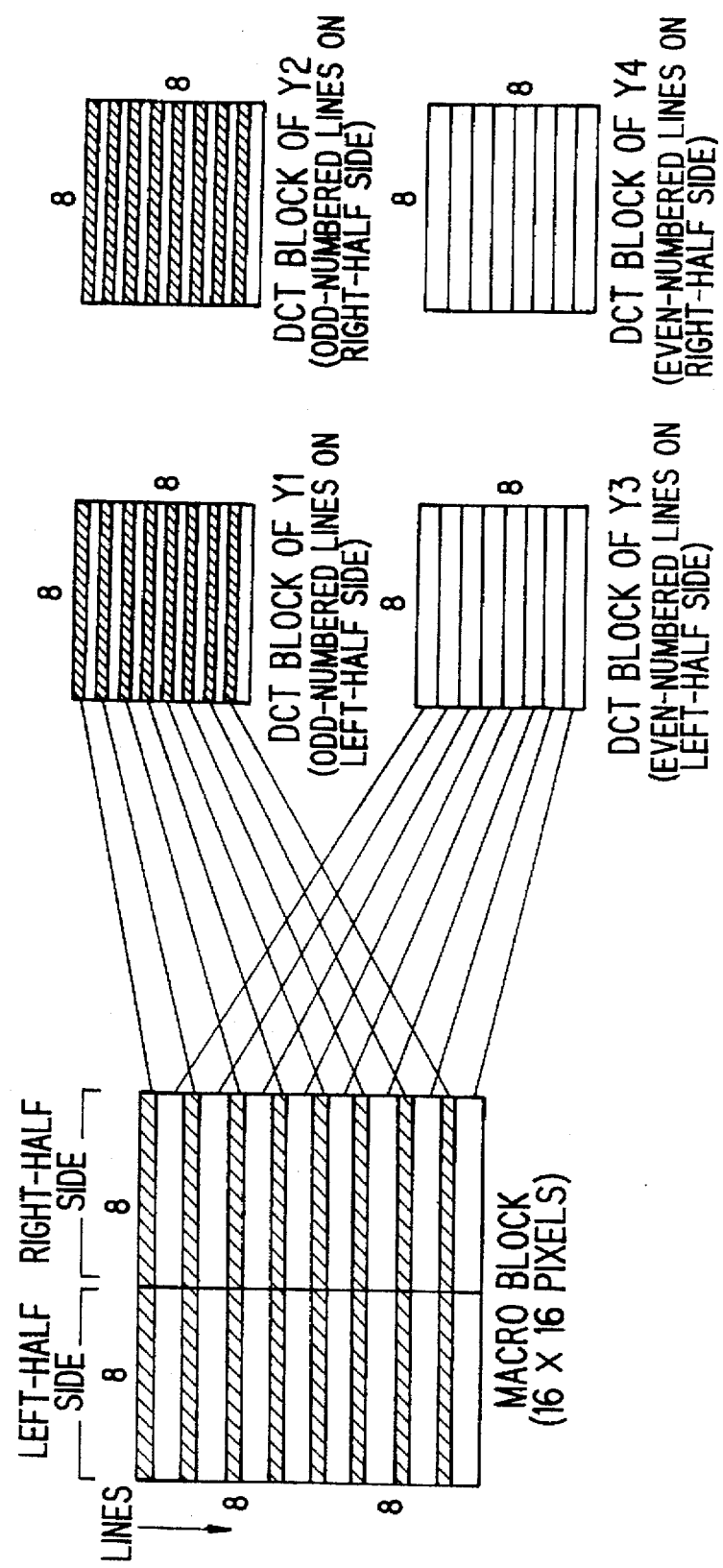
FIG. 14 is an illustrative view showing a structure of data of a field DCT.

FIGS. 13 and 14 show respective methods of constructing data of a field DCT and a frame DCT in the case of the ATV. There are two types of pictures, that is, one is a field-type type picture and the other is a frame-type picture. The field-type picture is formed by adaptively selecting field DCT and frame DCT. The frame-type picture is formed of field DCT alone because the field data is completely separate.

Figure 15:
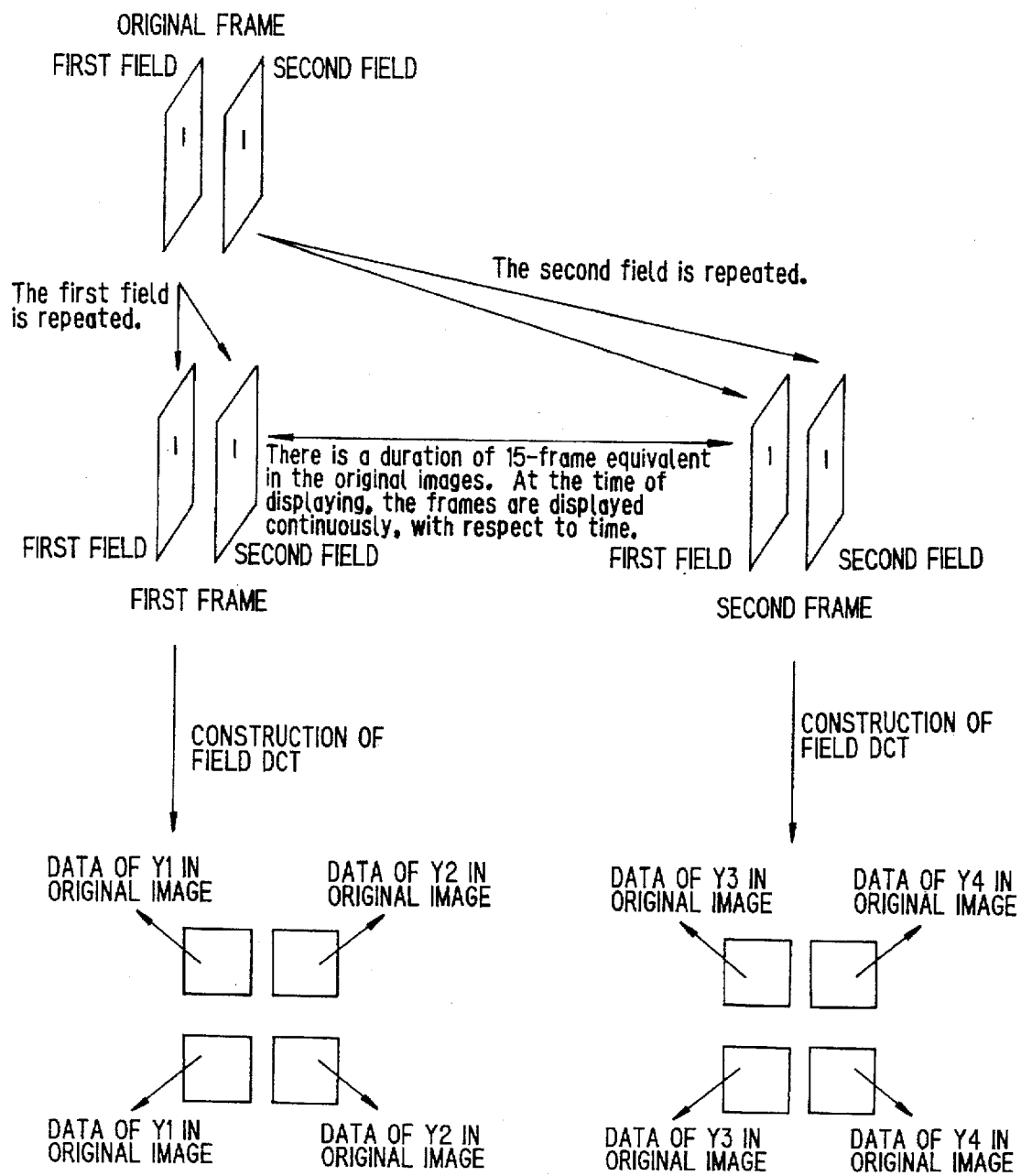
FIG. 15 is an illustrative view for explaining the method of the invention for repeatedly displaying images when a picture is reproduced at the 16x-speed playback mode and the data structures of field DCTs for the mode.

In the case where display is carried out for a two-frame period, if a picture is to be displayed in the form of frame structure, an original data in the form of field DCT structure is converted into a new first frame-structure data by replacing data segments Y3 and Y4 in a macro block shown in FIG. 14 with data segments Y1 and Y2. Next, the original data is converted into a new second frame structure data by replacing data segments Y1 and Y2 in the original macro block with the data segments Y3 and Y4. The thus newly formed first and second frames are displayed in this order during only one-frame period. This operation is done on the reproducing side. This procedure is shown in FIG. 15 in a simplified manner.

This procedure makes the displayed picture animate in a natural manner.

There is a problem that since time intervals of displaying frames are not equal; if the converted frames are repeatedly displayed during about three-frame period or longer, the animation of the picture becomes unnatural. Since the data segments Y1 and Y3 have identical data (similarly, the data segments Y2 and Y4 do), the same data segment is repeatedly arranged in successive two lines. Therefore, if an image has a high-resolution and should be reconstructed by using about four or more of a.c. coefficients, inclined lines tend to be distorted. Due to this reason, display of this method will not be performed in the 4x-speed playback mode.

Figure 16:
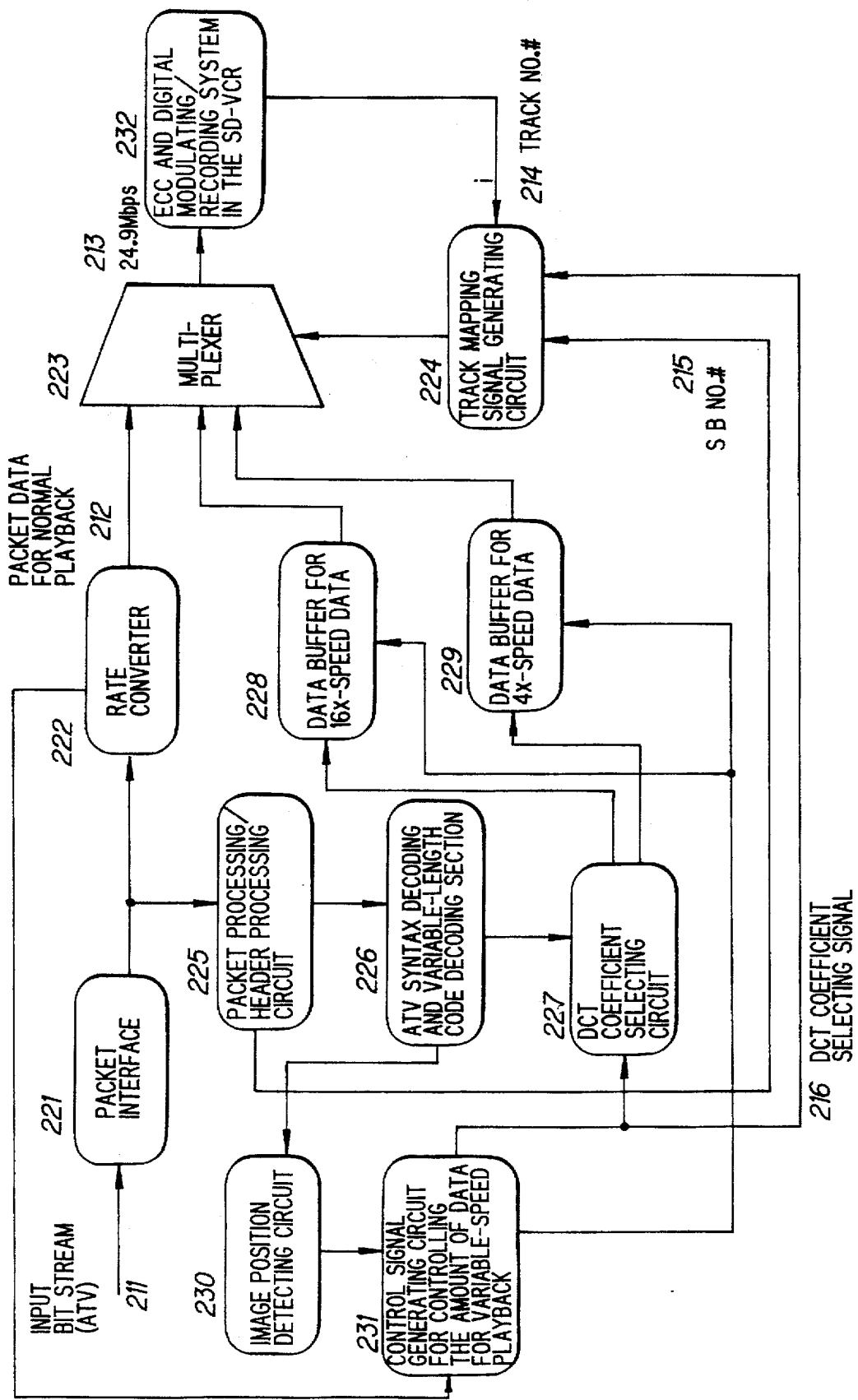
FIG. 16 is a block diagram showing a recording side of an embodiment of the invention.
Figure 17:
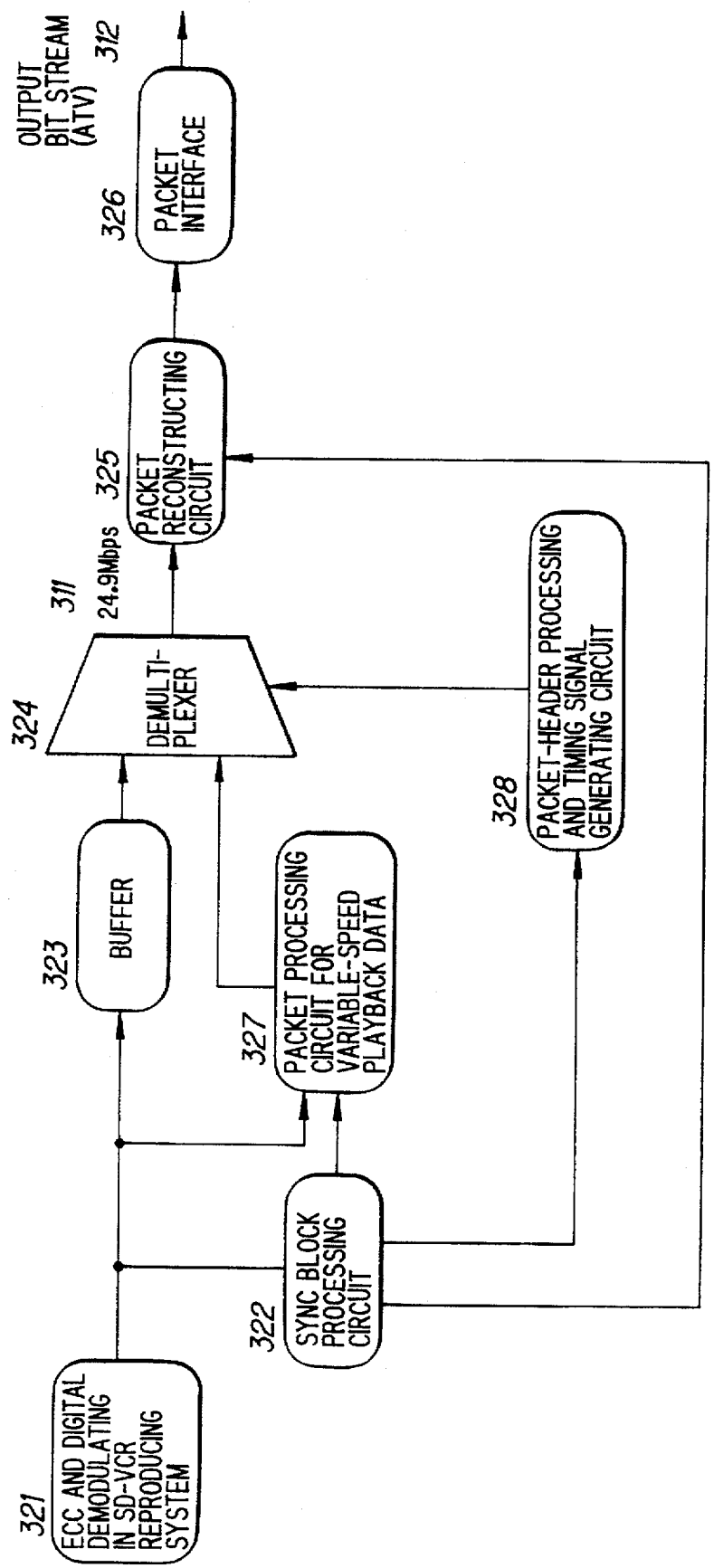
FIG. 17 is a block diagram showing a reproducing side of an first embodiment of the invention.

FIG. 16 is a block diagram showing a recording side of an embodiment of the invention and FIG. 17 is a block diagram showing a reproducing side of an embodiment of the invention. An inputted ATV data stream 211 passes through an interface 221 and then is sent to a rate converter 222 as well as to a packet and packet-header processing circuit 225. The rate converter 222 converts the data rate of the inputted data stream so that the converted data may satisfy requirements of the packet processing portions and the data processing rate thereafter. Then, the thus converted data stream is sent to a multiplexer 223 where the data stream is multiplexed based on data for variable-speed playback and SB units. The thus multiplexed data 213 is supplied to an ECC and digital modulating/recording system 232 in the SD-VCR and recorded on the tape.

The digital signal decoded as to transport packets and PES packets in the packet and packet-header processing circuit 225 is delivered to an ATV syntax decoding and variable-length code decoding section 226, where the signal is analyzed as to ATV headers and subjected to the variable-length code decoding operation. Then, the thus processed data is delivered to a DCT coefficient selecting circuit 227 and an image position detecting circuit 230. This image position detecting circuit 230 detects the image position from the decoded signal of the ATV syntax. A control signal generating circuit 231 for controlling the amount of data for variable-speed playback, refers to the detected image position and generates a DCT coefficient selecting signal 216 which indicates how many DCT coefficients should be selected. The DCT coefficient selecting circuit 227, based on the signal 216, selects DCT coefficients for all the speeds in the variable-speed playback mode. The thus selected DCT coefficients are synchronized in a 6x-speed mode data buffer 228 and a 4x-speed data mode data buffer 229 so as to be multiplexed in the multiplexer 223 with the data for normal playback, as described above. The control signal for effecting this multiplexing operation is generated by a track mapping signal generating circuit 224, based on the aforementioned DCT coefficient selecting signal 216, a signal 215 letting a current sync block number represent the amount of data multiplexed and a current track number 214.

In the normal playback mode, the signal from the SD-VTR reproducing system passes through a digital demodulating/ECC 321 and supplied to a SB data processing circuit 322 which discriminates whether the data supplied is data for normal playback or data for variable-speed playback. The data for normal playback is synchronized in a buffer 323 so as to be inputted to a demultiplexer 324 where the inputted data is de-multiplexed. Thereafter, a packet reconstructing circuit 325 recreates original packets, which in turn are outputted through a packet interface 326.

In the variable-speed playback mode, variable-speed playback data processing circuit 327 integrates the data intermittently reproduced and delivers the integrated data to the demultiplexer 324 in synchronism. The demultiplexer 324 de-multiplexes only required data, and then the packet reconstructing circuit 325 makes the data length of the de-multiplexed data match the length of the ATV packet and adds headers and the like to the data. Further, the circuit 325 produces a bit stream in which variable-speed playback image data for one frame are repeated as many as the variable-speed playback image of the frame should be repeatedly displayed. (These procedures are to be repeated to prepare a next frame and thereafter.) The thus produced bit stream is outputted through the packet interface 326.

Figure 18:
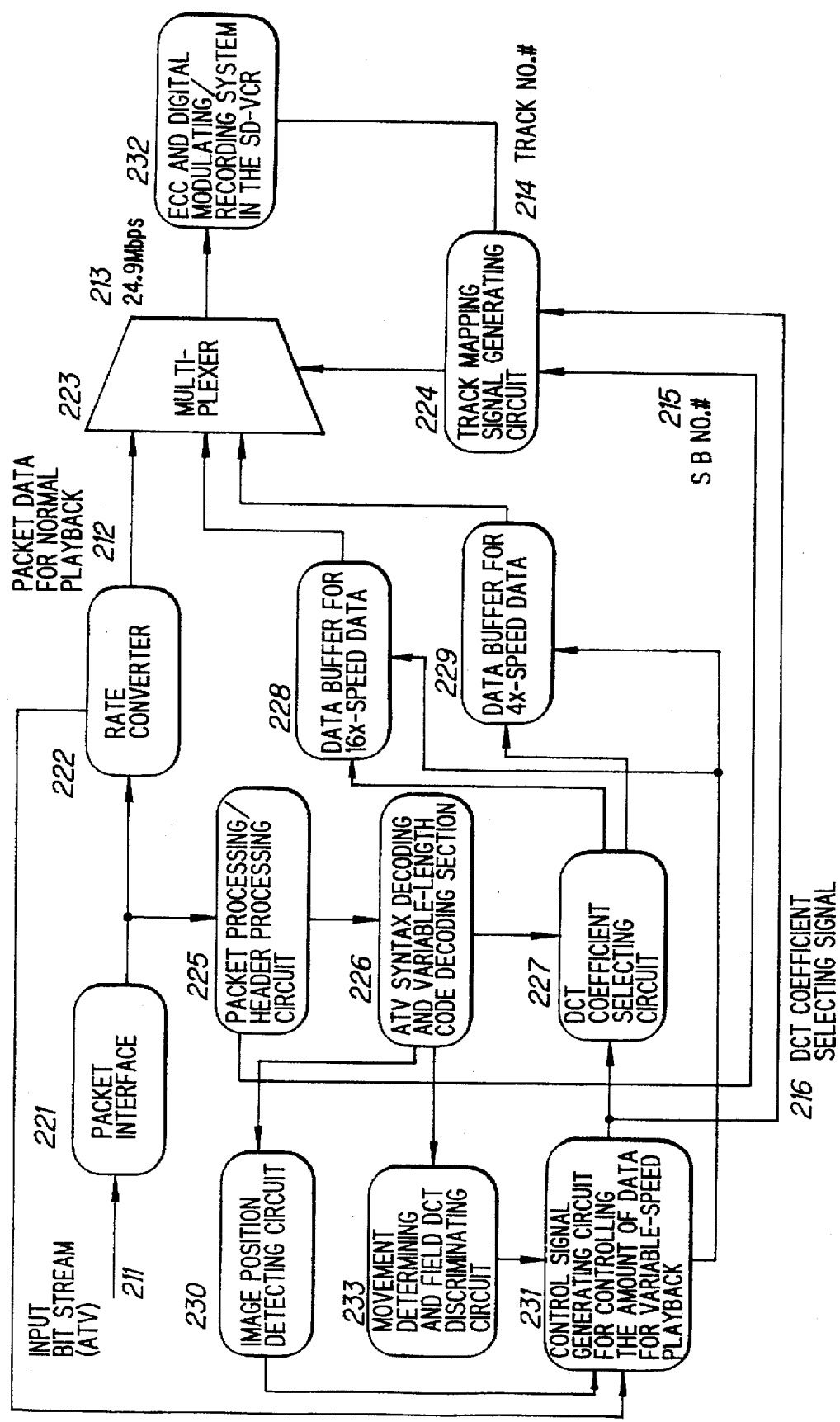
FIG. 18 is a block diagram showing a recording side of a second embodiment of the invention.

FIG. 18 is a block diagram showing a recording side of a second embodiment of the invention. The following description will be made on this embodiment. The reproducing side of the embodiment can be configured by the same circuit as in the first embodiment shown in FIG. 17.

Human's eyes can hardly perceive a sharp movement. Similarly, when a sharp movement is picked up by the video system, the definition of actual pictures is anyhow restricted by the band limitation, the time response of the video camera and the residual image on the monitor. Therefore, if the number of a.c. coefficients to be recorded for variable-speed playback is reduced in conformity with the movement of picture, it is possible to decrease the amount of data without degrading the quality of the visually observable picture. In the case of the ATV, the situation stated above can be limited to a condition in which the field DCT, which has weak correlation between fields, is effected. This situation can be known by checking information on pan or movement vectors for error-resilience contained in headers of the input bit stream. If there is no such information, the data need not be supplied to the discriminating circuit. In such a case, a.c. coefficients for variable-speed playback modes may and should be thinned or decreased uniformly in the field DCT, if any.

Alternatively, it is also possible to determine the number of a.c. coefficients to be used, based on the magnitude of movement vectors which is obtained by estimating or interpolating corresponding DCT blocks or MBs on B-frames before and after an I-frame in question.

After subjected to the ATV syntax decoding operation, the signal is supplied to a movement determining and field DCT discriminating circuit 233, wherein, if some movement in a field DCT block exceeds a prescribed threshold level, a signal indicating the fact is generated to be sent out to the control signal generating circuit 231 for controlling the amount of data for variable-speed playback. The circuit 231, based on the signal from the circuit 233, generates a DCT coefficient selecting signal 216 which specifies the number of a.c. coefficients, so that the DCT coefficient selecting circuit 227 selects a.c. coefficients.

The embodiment shown in FIG. 18 operates in the same manner as in the recording side circuit of the embodiment shown in FIG. 16, except that the additional operation as follows is added to the configuration of FIG. 16.

Figure 19:
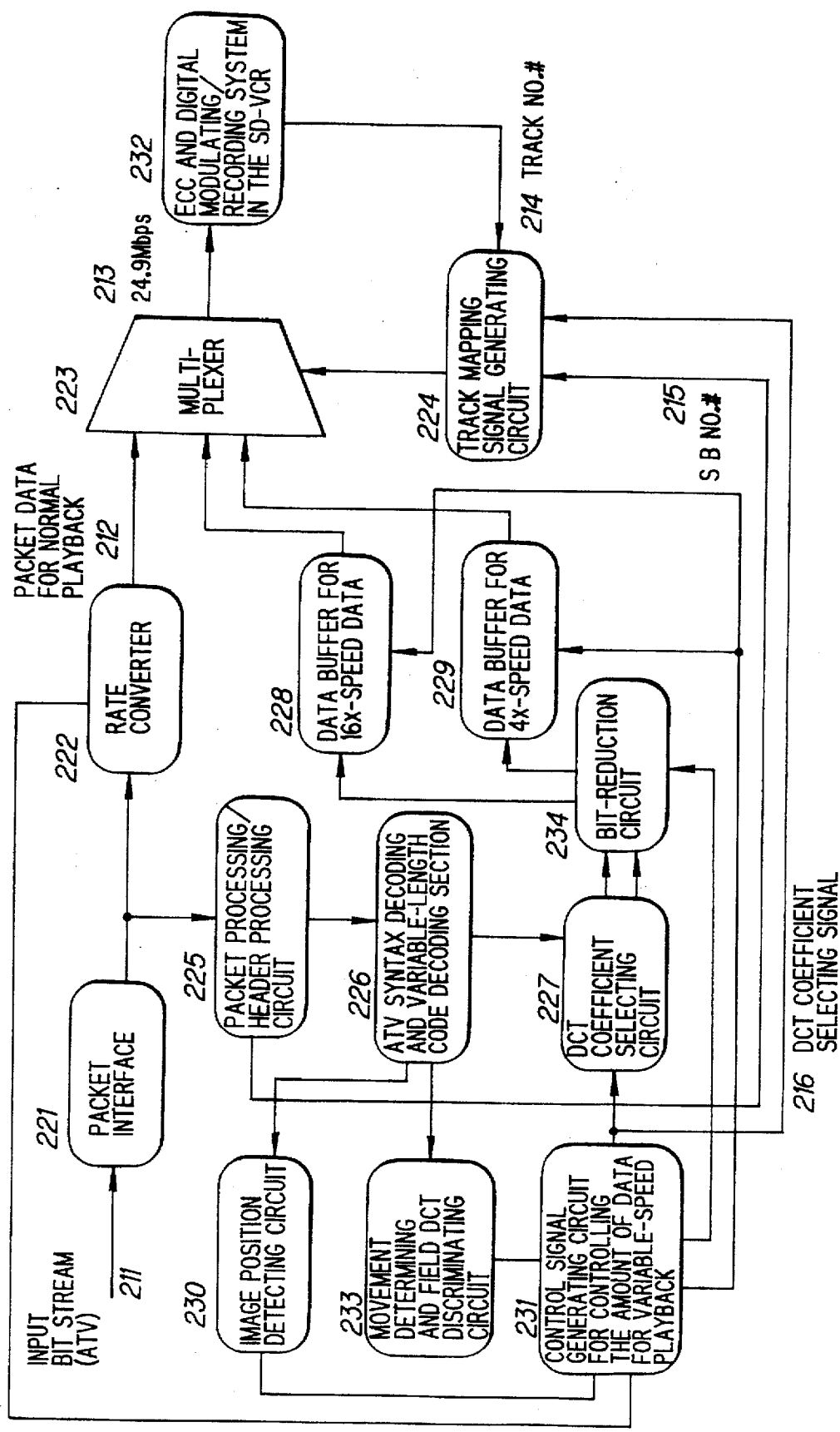
FIG. 19 is a block diagram showing a recording side of a third embodiment of the invention.

In the first and second embodiments, reduction of data is effected by selecting DCT coefficients as to a certain part of the video signal, in view of reducing the number of coefficients. FIG. 19 shows a variational embodiment of the second embodiment, in which, in order to reduce the amount of data, rounding operation of the least significant bits of the data indicating gradations is done as to a certain part of the video signal, in view of reducing the size of each coefficient. As in the above embodiment, reduction in the amount of data is effected by discriminating whether the data belongs to the peripheral part of the image frame, whether the data is transformed by the field DCT and how sharply the picture moves. Then, based on the signal determined from the discrimination, a bit-reduction circuit 234 rounds off the data of the video signal at the least or second least significant bit. When the rounded data is constructed of a variable-length code, the data should be replaced by a code having the shortest code-length and being closest to the level of the original code. In this operation, if there is no code having a shorter code-length, the level need not be changed. Since these operations can be formulated by a rule determined in advance and the transformation can be carried out based on the rule using ROMs, RAMs and the like, the size of the circuit and the processing time increase very little.

Thus, by combining the first, second and third embodiments, it is possible to reduce the amount of data while the quality of the image in an important part of the picture is maintained. Although, in the above description, an a.c. coefficient for one frame of an I-picture is assumed to have 16 bytes, the amount of data might increase if a picture of high-quality is inputted. Even if such a case occurs, it is possible to deal with the case, by combining the methods of the first, second and third embodiments.

Up to now, description has been made on the VTR system in which, in recording a video signal, the signal is used to generate data for variable-speed playback to be stored in areas from which the data can be read out in the variable-speed playback mode and at the time of reproducing in the variable-speed playback mode, the less data than in the usual playback mode is quickly read out. The configuration of reproducing operation at a variable speed can be applied similarly to any system in which recording areas of readable data is not limited while data-readout takes a longer time than data-decoding.

On the other hand, in a case where data-readout can be done in a shorter time than that required for data-decoding, any of the methods shown in the embodiments of the invention or their combination can be effected by only the operation at the time of reading out. Thereby, it is possible to watch briefed content of a picture recorded, in order to seize an outline of the picture in a short period of time.

For instance, when the ATV bit stream is stored in a large-capacity semiconductor memory, it is possible to save the time required for decoding the data by reading out data on the central part of the picture by every slicing unit. If data on the areas in the upper and lower ten MBs is not read out, the data to be processed becomes reduced to $1/1.4$. At this moment, data on the peripheral area is set at the pedestal level. Further, if only I- and P-pictures are adapted to be decoded for playback, the amount of data to be processed is reduced to about one-third. Accordingly, the whole content can be checked in about $1/4.2$ of the original time. Moreover, when only I-pictures are used, the amount of data is further reduced to $1/5$, that is, the whole content can be briefly checked in about $1/20$ of the original time.

Decoding of variable length codes is basically done by effecting pattern matching operations by every bit unit. Therefore, this operation requires many loops, taking more time than the other processing. Accordingly, if, in decoding the variable length codes, variable length codes with only a d.c. coefficient and two a.c. coefficients are taken to be subjected to the decoding operation, a further reduction of the processing time can be made. For instance, an animation of 2 hours at the normal speed can be watched in about five minutes.

In the above case, this method is useful when the user wants to roughly grasp the content of video data recorded, although there is no need for searching a head or start of content as needed in the VTR system.

The present invention relates a recording apparatus for recording television signals having a wide band-range for the ATV, HDTV or the like which, in recent years, attracts a good deal of public attention as a near-future television apparatus of high quality of image with a wide display. That is, the present invention relates to a digital VTR which is able to record a band-compressed signal having a bit-rate of 17 to 60 Mbps of a program while creating a low-bit-rate signal (1.5 to 5 Mbps) having the same program content as well as utilizing the low-bit-rate signal as a signal for the special playback. In this apparatus, the present invention proposes a first method that variable-speed playback data for a certain speed, which is recorded in the limited recording areas for variable-speed playback mode, is adapted to be used for playback at another speed in the variable-speed playback mode. Further, the invention proposes a second method that data structure of variable-speed playback data is adapted to change depending on the image areas on the image frame. Either of the above methods or the combination of them is able to improve the quality of picture at the variable-speed playback mode in which a less amount of data is available than that of data read out at the time of the normal playback mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital recording and reproducing apparatus which records a desired video signal onto a recording medium by compressing the band range of the desired video signal using a high-efficiency coding technique, the digital recording and reproducing apparatus comprising:

means for recording part of video data for variable-speed playback onto different recording tracks from those on which video data for normal playback is recorded; and means for forming the video data for variable-speed playback to be recorded by extracting part of the video data for variable-speed playback from the desired video signal in such a manner that more a.c. components are allotted to a central part of an image frame than a peripheral part of the image frame such that the quality of a picture reproduced during a variable-speed playback mode is improved from the peripheral part of the image frame of the reproduced picture toward the central part thereof.

2. The digital recording and reproducing apparatus according to claim 1, further comprising means for allotting, in a case where a discrete cosine transform is used to compress the band range of the desired video signal, only a d.c. component or part of the d.c. component to data for the peripheral part of the image frame of a reproduced picture during the variable-speed playback mode and for allotting the a.c. components to data for the central part of the image frame of the reproduced picture, in such a manner that an amount of the a.c. components is increased toward the central part of the image frame.

3. The digital recording and reproducing apparatus according to claim 1, further comprising means for extracting, in a case where the variable speed playback mode is effected at multiple steps of speed, part of the video data and for increasing an amount of the extracted part as a speed of variable-speed playback decreases, to form the video data for variable-speed playback to be recorded.

4. The digital recording and reproducing apparatus according to claim 1, further comprising means for forming, in a case where the variable-speed playback mode is effected at multiple steps of speed, the video data for variable-speed playback to be recorded, such that part of the video data recorded on the recording medium can be shared between different playback speed modes.

5. The digital recording and reproducing apparatus according to claim 1, wherein when part of the video signal whose necessary band range has been compressed is recorded as data for variable-speed playback, the amount of a.c. components of data on the peripheral part of the image frame of the reproduced picture is reduced if the reproduced picture changes fast and the amount of the a.c. components is increased as change of the reproduced picture becomes slow, the a.c. components being high-frequency components.

6. The digital recording and reproducing apparatus according to claim 1, wherein when part of the video signal whose necessary band range has been compressed is recorded as data for variable-speed playback, least significant bits of data on the peripheral part of the image frame of the reproduced picture are abandoned if the reproduced picture changes fast and the least significant bits are added one by one to increase gradations as change of the reproduced picture becomes slow.

7. The digital recording and reproducing apparatus according to any of claims 1 and 3, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for allotting only a d.c. component or part of the d.c. component to data for the peripheral part of the image frame of the reproduced picture during the variable-speed playback mode from the three color signals and for allotting the a.c. components to data for the central part of the image frame of the reproduced picture from the three color signals, in such a manner that the amount of the a.c. components is increased toward the central part of the image frame.

8. The digital recording and reproducing apparatus according to claim 2, further comprising means for forming, in a case where the variable-speed playback mode is effected at multiple steps of speed, the video data for variable-speed playback to be recorded, such that part of the video data recorded on the recording medium can be shared between different playback speed modes.

9. The digital recording and reproducing apparatus according to claim 3, further comprising means for forming, in a case where the variable-speed playback mode is effected at multiple steps of speed, the video data for variable-speed playback to be recorded, such that part of the video data recorded on the recording medium can be shared between different playback speed modes.

10. The digital recording and reproducing apparatus according to claim 3, wherein when part of the video signal whose necessary band range has been compressed is recorded as data for variable-speed playback, the amount of a.c. components of data on the peripheral part of the image frame of the reproduced picture is reduced if the reproduced picture changes fast and the amount of the a.c. components is increased as change of the reproduced picture becomes slow, the a.c. components being high-frequency components.

11. The digital recording and reproducing apparatus according to claim 2, wherein when part of the video signal whose necessary band range has been compressed is recorded as data for variable-speed playback, least significant bits of data on the peripheral part of the image frame of the reproduced picture are abandoned if the reproduced picture changes fast and the least significant bits are added one by one to increase gradations as change of the reproduced picture becomes slow.

12. The digital recording and reproducing apparatus according to claim 3, wherein when part of the video signal whose necessary band range has been compressed is recorded as data for variable-speed playback, least significant bits of data on the peripheral part of the image frame of the reproduced picture are abandoned if the reproduced picture changes fast and the least significant bits are added one by one to increase gradations as change of the reproduced picture becomes slow.

13. The digital recording and reproducing apparatus according to any of claims 1 and 2, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for extracting part of the video data from the three color signals and for increasing an amount of the extracted part as a speed of variable-speed playback decreases, to form the video data for variable-speed playback to be recorded.

14. The digital recording and reproducing apparatus according to any of claims 1, 2 and 3, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for forming the video data for variable-speed playback to be recorded from the three color signals, such that part of the video data recorded on the recording medium can be shared between different playback speed modes.

15. The digital recording and reproducing apparatus according to any of claims 1 and 3, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for reducing the amount of a.c. components of data from the three color signals on the peripheral part of the image frame of the reproduced picture if the reproduced picture changes fast and for increasing the amount of the a.c. components as change of the reproduced picture becomes slow, the a.c. components being high frequency components.

16. The digital recording and reproducing apparatus according to any of claims 1, 2 and 3, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for abandoning least significant bits of data on the peripheral part of the image frame of the reproduced picture if the reproduced picture changes fast and for adding the least significant bits one by one to increase gradations as change of the reproduced picture becomes slow.

17. The digital recording and reproducing apparatus according to claim 1, 2, 3 or 4, wherein in a case where a first image for variable-speed playback consisting of one frame is displayed for a duration of some or several frames and a second image for variable-speed playback of a next frame is displayed, successively and repeatedly, in order to display the two frames that are made from each field of one frame, repeatedly in a specified displaying duration, the digital recording and reproducing apparatus forms two frames from one frame selected depending on a position of the image and a moving amount of images, from a first scheme of which two fields are converted into two frames by converting field data by every DCT block of an image or by every macro block consisting of a plurality of DCT blocks, into frame data; and a second scheme of which one frame is converted into two frames by merely repeating the frame by itself.

18. The digital recording and reproducing apparatus according to claim 4 or 9, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for allotting only a d.c. component or part of the d.c. component to data for the peripheral part of the image frame of the reproduced picture during the variable-speed playback mode from the three color signals and for allotting the a.c. components to data for the central part of the image frame of the reproduced picture from the three color signals, in such a manner that the amount of the a.c. components is increased toward the central part of the image frame.

19. The digital recording and reproducing apparatus according to claim 18, wherein in a case where a first image for variable-speed playback consisting of one frame is displayed for a duration of some or several frames and a second image for variable-speed playback of a next frame is displayed, successively and repeatedly, in order to display the two frames that are made from each field of one frame, repeatedly in a specified displaying duration, the digital recording and reproducing apparatus forms two frames from one frame selected depending on a position of the image and a moving amount of images, from a first scheme of which two fields are converted into two frames by converting field data by every DCT block of an image or by every macro block consisting of a plurality of DCT blocks, into frame data; and a second scheme of which one frame is converted into two frames by merely repeating the frame by itself.

20. The digital recording and reproducing apparatus according to claim 4 or 8, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for extracting part of the video data from the three color signals and for increasing the amount of the extracted part as the speed of variable-speed playback decreases, to form the video data for variable-speed playback to be recorded.

21. The digital recording and reproducing apparatus according to claim 4 or 9, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for reducing the amount of a.c. components of data from the three color signals on the peripheral part of the image frame of the reproduced picture if the reproduced picture changes fast and for increasing the amount of the a.c. components as change of the reproduced picture becomes slow, the a.c. components being high-frequency components.

22. The digital recording and reproducing apparatus according to claim 4, 8 or 9, wherein when part of the video signal whose necessary band range has been compressed is recorded as data for variable-speed playback, different conditions are separately set up for three color signals of the video data including a luminance signal and two kinds of chrominance signals, the digital recording and reproducing apparatus further comprising:

means for abandoning least significant bits of data from the three color signals on the peripheral part of the image frame of the reproduced picture if the reproduced picture changes fast and for adding the least significant bits of data from the three color signals one by one to increase gradations as change of the reproduced picture becomes slow.

23. The digital recording and reproducing apparatus according to claim 5, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for extracting part of the video data from the three color signals and for increasing an amount of the extracted part as the speed of variable-speed playback decreases, to form the video data for variable-speed playback to be recorded.

24. The digital recording and reproducing apparatus according to claim 23, wherein in a case where a first image for variable-speed playback consisting of one frame is displayed for a duration of some or several frames and a second image for variable-speed playback of a next frame is displayed, successively and repeatedly, in order to display the two frames that are made from each field of one frame, repeatedly in a specified displaying duration, the digital recording and reproducing apparatus forms two frames from one frame selected depending on a position of the image and the moving amount of images, from a first scheme of which two fields are converted into two frames by converting field data by every DCT block of an image or by every macro block consisting of a plurality of DCT blocks, into frame data; and a second scheme of which one frame is converted into two frames by merely repeating the frame by itself.

25. The digital recording and reproducing apparatus according to claim 5 or 10, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for forming the video data from the three color signals for variable-speed playback to be recorded, such that part of the video data recorded on the recording medium can be shared between different playback speed modes.

26. The digital recording and reproducing apparatus according to claim 5 or 10, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for abandoning least significant bits of data of the three color signals on the outermost part of the frame of a reproduced picture if the reproduced picture changes fast and for adding the least significant bits of data of the three color signals one by one to increase gradations as change of the reproduced picture becomes slow.

27. The digital recording and reproducing apparatus according to claim 6 or 12, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for allotting only a d.c. component or part of the d.c. component to data for the peripheral part of the image frame of the reproduced picture during the variable-speed playback mode and for allotting the a.c. components to data for the central part of the image frame of the reproduced picture, in such a manner that the amount of the a.c. components is increased toward the central part of the image frame.

28. The digital recording and reproducing apparatus according to claim 27, wherein in a case where a first image for variable-speed playback consisting of one frame is displayed for a duration of some or several frames and a second image for variable-speed playback of a next frame is displayed, successively and repeatedly, in order to display the two frames that are made from each field of one frame, repeatedly in a specified displaying duration, the digital recording and reproducing apparatus forms two frames from one frame selected depending on a position of the image and a moving amount of images, from a first scheme of which two fields are converted into two frames by converting field data by every DCT block of an image or by every macro block consisting of a plurality of DCT blocks, into frame data; and a second scheme of which one frame is converted into two frames by merely repeating the frame by itself.

29. The digital recording and reproducing apparatus according to claim 6 or 11, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for extracting part of the video data of the three color signals and for increasing an amount of the extracted part as the speed of variable-speed playback decreases, to form the video data for variable-speed playback to be recorded.

30. The digital recording and reproducing apparatus according to claim 6, 11 or 12, wherein when part of the video signal whose necessary band range has been compressed is recorded as data for variable-speed playback, different conditions are separately set up for three color signals of the video signal including a luminance signal and two kinds of chrominance signals, the digital recording and reproducing apparatus further comprising:

means for forming the video data from the three color signals for variable-speed playback to be recorded, such that part of the video data recorded on the recording medium can be shared between different playback speed modes.

31. The digital recording and reproducing apparatus according to claim 6 or 12, wherein part of the video signal whose necessary band range has been compressed is recorded as data for variable-speed playback, different conditions are separately set up for three color signals of the video signal including a luminace signal and two kinds of chrominance signals, the digital recording and reproducing apparatus further comprising:

means for reducing the amount of a.c. components of data from the three color signals on the outermost part of the image frame of the reproduced picture if the reproduced picture changes fast and for increasing the amount of the a.c. components as change of the reproduced picture becomes slow, the a.c. components being high-frequency components.

32. The digital recording and reproducing apparatus according to claim 7, wherein in a case where a first image for variable-speed playback consisting of one frame is displayed for a duration of some or several frames and a second image for variable-speed playback of a next frame is displayed, successively and repeatedly, in order to display the two frames that are made from each field of one frame, repeatedly in a specified displaying duration, the digital recording and reproducing apparatus forms two frames from one frame selected depending on a position of the image and a moving amount of images, from a first scheme of which two fields are converted into two frames by converting field data by every DCT block of an image or by every macro block consisting of a plurality of DCT blocks, into frame data; and a second scheme of which one frame is converted into two frames by merely repeating the frame by itself.

* * * * *